US012670517B2

(12) United States Patent
Rose et al.

(10) Patent No.: US 12,670,517 B2
(45) Date of Patent: Jun. 30, 2026

(54) METHODS AND APPARATUS FOR ENHANCED PRODUCT RECOMMENDATIONS

(71) Applicant: Under Armour, Inc., Baltimore, MD (US)

(72) Inventors: Madeline Taylor Rose, Austin, TX (US); Patrick Howell, San Francisco, CA (US); Joohyun Kim, San Francisco, CA (US); Murtaza Ali, Austin, TX (US); Sid Jatia, Austin, TX (US); Chul Lee, San Francisco, CA (US)

(73) Assignee: Under Armour, Inc., Baltimore, MD (US)

( * ) Notice: Subject to any disclaimer, the term of this patent is extended or adjusted under 35 U.S.C. 154(b) by 448 days.

(21) Appl. No.: 17/804,691

(22) Filed: May 31, 2022

(65) Prior Publication Data

US 2022/0292574 A1 Sep. 15, 2022

Related U.S. Application Data

(63) Continuation of application No. 15/086,476, filed on Mar. 31, 2016, now Pat. No. 11,393,007.

(51) Int. Cl.
G06Q 30/00 (2023.01)
G06Q 30/0601 (2023.01)
H04L 67/306 (2022.01)

(52) U.S. Cl.
CPC ....... *G06Q 30/0631* (2013.01); *H04L 67/306* (2013.01)

(58) Field of Classification Search
CPC ............. G06Q 30/0631; G06Q 30/631; G06Q 30/06312; G06Q 30/06313; G06Q 30/06314; G06Q 30/06315; H04L 67/306
(Continued)

(56) References Cited

U.S. PATENT DOCUMENTS 5,848,399 A 12/1998 Burke
5,930,769 A 7/1999 Rose
(Continued)

FOREIGN PATENT DOCUMENTS

KR 20130089770 A 8/2013
TW 201224983 A 6/2012

OTHER PUBLICATIONS

Clustering-based diversity improvement in top-N recommendation Aytekin, Tevfik; Karakaya, Mahmut Ozge. Journal of Intelligent Information Systems42.1: 1-18. Springer Nature B.V. (Feb. 2014); Dialog #1492205154 17pgs (Year: 2014).*
(Continued)

*Primary Examiner* — Robert M Pond
(74) *Attorney, Agent, or Firm* — Wang Hardoon, P.C.

(57) ABSTRACT

Apparatus and methods are given for providing enhanced product recommendations. In one embodiment, products are recommended to a consumer based on information manually entered by the consumer and/or derived from data relating to the consumer obtained from a health-monitoring platform. The recommended products are provided from a recommendation engine to a human operator or curator at an item selection entity, the curator selects a predetermined number of the recommended products for delivery to the consumer. Such delivery is established by the consumer to occur periodically (such as monthly) as part of a subscription service. Product recommendations are adjusted over time to relate to customer activity and interest data accumulated from the health-monitoring platform. In one embodiment, a recommendation engine is configured to specifically tailor its recommendation algorithms based on feedback information received from the curator and/or the consumer.

20 Claims, 14 Drawing Sheets

(58) Field of Classification Search
USPC ...................................................... 705/26, 27
See application file for complete search history.

(56) References Cited

U.S. PATENT DOCUMENTS

| | | | |
|---|---|---|---|
| 7,579,946 B2 | 8/2009 | Case, Jr. | |
| 7,987,182 B2 | 7/2011 | Slothouber et al. | |
| 8,005,692 B2 | 8/2011 | Karkanias et al. | |
| 8,762,226 B2 | 6/2014 | Kalin et al. | |
| 8,838,583 B1 | 9/2014 | Fox | |
| 9,087,234 B2 | 7/2015 | Hoffman et al. | |
| 10,102,559 B1 | 10/2018 | Jain et al. | |
| 10,223,710 B2 * | 3/2019 | Purves | G06Q 20/3224 |
| 10,475,101 B1 | 11/2019 | Forte et al. | |
| 10,956,956 B2 | 3/2021 | Bhardwaj et al. | |
| 2002/0178074 A1 | 11/2002 | Bloom | |
| 2003/0171944 A1 | 9/2003 | Fine et al. | |
| 2008/0104111 A1 * | 5/2008 | Slaney | G06Q 30/02 |
| 2008/0126190 A1 | 5/2008 | Gosnell | |
| 2008/0249837 A1 | 10/2008 | Angell et al. | |
| 2008/0262918 A1 | 10/2008 | Wiener | |
| 2008/0270398 A1 | 10/2008 | Landau et al. | |
| 2009/0163183 A1 | 6/2009 | O'donoghue et al. | |
| 2009/0299996 A1 | 12/2009 | Yu et al. | |
| 2010/0030578 A1 | 2/2010 | Siddique et al. | |
| 2011/0066497 A1 | 3/2011 | Gopinath et al. | |
| 2011/0230986 A1 | 9/2011 | Lafortune et al. | |
| 2012/0041767 A1 | 2/2012 | Hoffman et al. | |
| 2012/0116550 A1 | 5/2012 | Hoffman et al. | |
| 2012/0158460 A1 | 6/2012 | Kruger et al. | |
| 2012/0290518 A1 | 11/2012 | Flinn et al. | |
| 2013/0013331 A1 | 1/2013 | Horseman | |
| 2013/0173413 A1 | 7/2013 | Page et al. | |
| 2013/0196297 A1 | 8/2013 | Anwar | |
| 2013/0197679 A1 | 8/2013 | Balakrishnan et al. | |
| 2013/0246177 A1 | 9/2013 | Fischer et al. | |
| 2013/0246178 A1 | 9/2013 | Fischer et al. | |
| 2013/0304570 A1 * | 11/2013 | Johnson | G06Q 30/02 705/14.66 |
| 2014/0052567 A1 | 2/2014 | Bhardwaj et al. | |
| 2014/0070957 A1 | 3/2014 | Longinotti-Buitoni et al. | |
| 2014/0129942 A1 | 5/2014 | Rathod | |
| 2014/0207610 A1 * | 7/2014 | Erez | G06Q 30/0633 705/26.81 |
| 2014/0236622 A1 | 8/2014 | Southam | |
| 2014/0244395 A1 | 8/2014 | Case, Jr. | |
| 2014/0278125 A1 | 9/2014 | Balakrishnan et al. | |
| 2014/0288680 A1 * | 9/2014 | Hoffman | G09B 5/02 700/91 |
| 2014/0335490 A1 | 11/2014 | Baarman et al. | |
| 2014/0358635 A1 | 12/2014 | Bao et al. | |
| 2014/0379524 A1 | 12/2014 | Grimaud et al. | |
| 2015/0058135 A1 | 2/2015 | Kelly et al. | |
| 2015/0073907 A1 * | 3/2015 | Purves | G06Q 20/384 705/14.58 |
| 2015/0073931 A1 | 3/2015 | Ronen et al. | |
| 2015/0112918 A1 | 4/2015 | Zheng et al. | |
| 2015/0156529 A1 | 6/2015 | Peterson | |
| 2015/0182843 A1 | 7/2015 | Esposito et al. | |
| 2015/0193548 A1 | 7/2015 | Nice et al. | |
| 2015/0242929 A1 | 8/2015 | Wilkinson et al. | |
| 2015/0278909 A1 | 10/2015 | Bax | |
| 2015/0287338 A1 | 10/2015 | Wells et al. | |
| 2016/0007933 A1 * | 1/2016 | Duddy | A61B 5/1123 600/595 |
| 2016/0042315 A1 | 2/2016 | Field-Darragh et al. | |
| 2016/0147752 A1 | 5/2016 | Manning et al. | |
| 2016/0171588 A1 * | 6/2016 | Linden | G06F 3/0482 705/26.7 |
| 2016/0379515 A1 * | 12/2016 | Okubo | G09B 5/02 434/365 |
| 2017/0020461 A1 | 1/2017 | Quinn et al. | |
| 2017/0287044 A1 | 10/2017 | Rose et al. | |
| 2020/0070838 A1 * | 3/2020 | Smith | G08B 25/08 |

OTHER PUBLICATIONS

Clustering-based diversity improvement in top-N recommendation Ayetekin, Tevfik; Karakaya, Mahmut Ozge. Journal of Intelligent Information Systems 42.1: 1-18. Springer Nature B.V. (Feb. 2014); Dialog #1492205154 17pgs (Year2014).

* cited by examiner

Figure 3D:
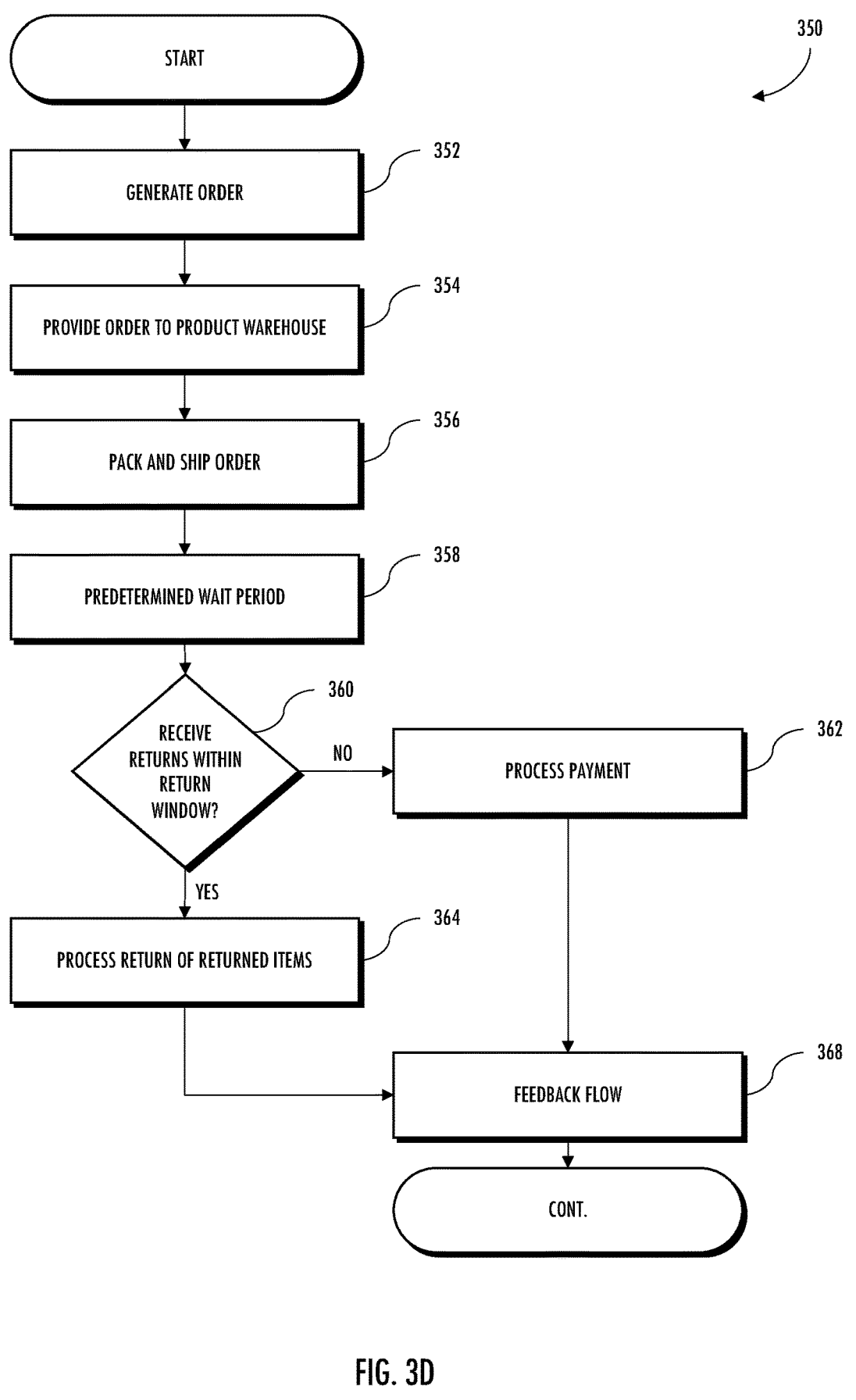

350

START

GENERATE ORDER — 352

PROVIDE ORDER TO PRODUCT WAREHOUSE — 354

PACK AND SHIP ORDER — 356

PREDETERMINED WAIT PERIOD — 358

RECEIVE RETURNS WITHIN RETURN WINDOW? — 360

NO → PROCESS PAYMENT — 362

YES

PROCESS RETURN OF RETURNED ITEMS — 364

FEEDBACK FLOW — 368

METHODS AND APPARATUS FOR ENHANCED PRODUCT RECOMMENDATIONS

PRIORITY

This application is a continuation of and claims the benefit of priority to U.S. patent application Ser. No. 15/086,476 entitled "METHODS AND APPARATUS FOR ENHANCED PRODUCT RECOMMENDATIONS" filed Mar. 31, 2016, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to the field of product recommendations. More particularly, the present disclosure relates to methods, devices, systems, and computer programs for providing enhanced product recommendations using a feedback-based learning mechanism.

DESCRIPTION OF RELATED TECHNOLOGY

The background description provided herein is for the purpose of generally presenting the context of the disclosure. Unless otherwise indicated herein, the materials described in this or any section of the disclosure are not prior art to the claims in this application and are not admitted to be prior art by inclusion herein.

Online shopping provides a mechanism to enable consumers to peruse products for purchase at their convenience. Via online shopping mechanisms, consumers can read detailed product descriptions, examine pictures of the items, and read other consumer's reviews in order to make a fully informed purchase decision. Accordingly, every major seller of goods has items available for purchase online through brand published websites and/or secondary retailer websites. Additionally, certain sellers provide online exclusive products, i.e., products that are only available for purchase online, and/or an online-only outlet for discounted or discontinued products. As the popularity of online shopping increases, consumers are often overwhelmed by the vast quantity of available products and navigating this product landscape can often frustrate or confuse a consumer.

Moreover, it is not uncommon for a consumer, when faced with this seemingly unending supply of products, to forget or misremember items he/she intended to purchase. That is, when navigating an online store, the consumer may become distracted (such as by environmental or external factors and/or by content on the website) and therefore less likely to remember to purchase items which were intended to be purchased and/or repurchase items which may need replacement.

To assist in online shopping, certain prior art recommendation engines have been utilized to provide a consumer with a manageable list of products once the consumer has entered one or more criteria. However, such recommendation engines are often unable to generate recommendations which are tailored to a particular consumer in any meaningful way (other than based on the consumer's manually entered criteria). For example, the user must enter one or more criteria for filtering the vast number of available products, such as by price, size, color, etc.

In addition, a customer may subscribe to a monthly subscription service to receive product recommendations. However, product recommendations in monthly subscription services fail to uniquely target a particular customer. Instead such monthly services often merely provide a set or group of products to a group of only superficially similar customers. For example, beauty related subscription services may group users according to gender, skin tone/color, hair color, eye color, and general style; each of the foregoing being manually entered by the consumer when establishing a subscription.

Therefore, what is needed is a system for recommending products for purchase based on information regarding the consumer obtained in other social media platforms which directly relate to the recommended product. Ideally, the consumer would perform minimal manual entry of profile details (if any) in order to receive highly targeted products for purchase. Moreover, the ideal recommendation system would be configured to learn or improve recommendations over time via and advanced feedback system. Apparatus and methods for accomplishing the foregoing are provided in the present disclosure.

BRIEF DESCRIPTION OF THE DRAWINGS

FIG. 3D is a logical flow diagram illustrating a generalized method for fulfilling a curator-selected order of computer-recommended products in accordance with one embodiment of the present disclosure.

DETAILED DESCRIPTION

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Figure 1A:
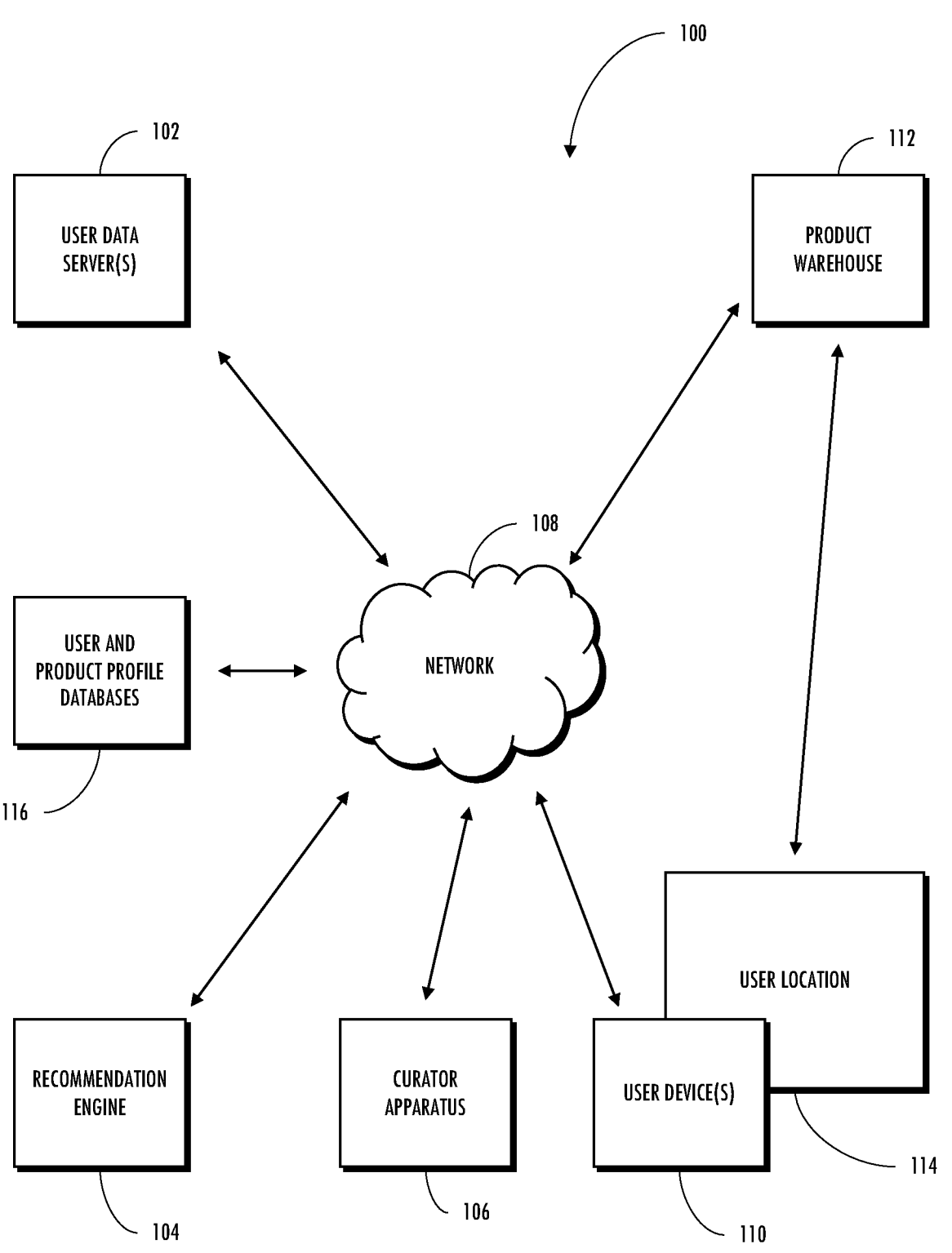
FIG. 1A is a block diagram illustrating an exemplary network for providing enhanced product recommendations in accordance with one embodiment of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.
Exemplary Networks Referring now to FIG. 1A, an exemplary network 100 for enabling advanced product recommendations in accordance with one embodiment of the present disclosure is illustrated. Communication between each of the devices in the network 100 illustrated in FIG. 1A is enabled via the communication network 108. Specifically, a recommendation engine 104 is placed in communication with a curator apparatus 106 and one or more user data servers 102 via a network 108. In addition, the curator apparatus 106 is placed in communication with a plurality of user devices 110 and a product warehouse 112 via the network 108. The product warehouse 112 may further communicate to the recommendation engine 104 in one embodiment. Each of the foregoing components will be discussed in further detail below.

The communication network 108 which enables communication between the aforementioned devices/entities may comprise a wired and/or wireless, private and/or public network, including e.g., the Internet. Accordingly, each of the devices (e.g., user data servers 102, recommendation engine 104, curator apparatus 106, user devices 110 and product warehouse 112) is configured with appropriate networking communication interfaces. An example of wired communication interface may include, but is not limited to, Ethernet; while examples of wireless communication interfaces may include, but are not limited to, near field communication (NFC), Bluetooth, WiFi, 4G or 5G LTE. It is further appreciated that various gateways, routers, switches, based stations, and so forth may be placed between the communication interfaces of foregoing devices.

The user device 110 (or client/consumer device) comprises a stationary or portable computing apparatus which is configured to run a plurality of software applications thereon (as discussed in detail below). For example, the user device 110 may comprise a desktop computer (such as those available from Dell Computing of Austin, Tex.), or smartphone, computing tablet, laptop computer, electronic reader, personal digital assistant, and so forth. Exemplary embodiments include e.g., Galaxy S4® from Samsung Electronics of Seoul, Korea, iPhone® or iPad® from Apple Computer of Cupertino, Calif. As illustrated in FIG. 1A, the user or consumer device 110 is associated to a user or consumer location 114 for shipping purposes (discussed below); however, as noted the device 110 may be mobile and/or not necessarily located at the user location 114.

In one embodiment, the user device 110 is in communication with a plurality of health monitoring devices (not shown) and/or the user device 110 may further comprise a health monitoring device. Heath monitoring devices comprise portable computing devices designed to measure, sense, monitor, or otherwise receive biometric, environmental, and/or activity parameters. In one variant, the health monitoring devices may comprise wearable health-related parameter measurement and computing devices, such as e.g., a smart watch, an activity tracker, a heart rate monitor, a sleep tracking device, a nutrition tracking device, a smart scale, and/or smart eyeglasses. In addition, user device 110 may comprise a smart phone having one or more of the foregoing capabilities and/or which enables user entry of the foregoing health parameters.

The user device 110 receives health-parameter related data collected or obtained from the monitoring devices (not shown) via the network 108 in one embodiment. Alternatively, or in addition, health-parameter related data may be collected or obtained at the device 110 itself. The sensed or obtained data comprises data which the particular device is configured to collect (such as activity, biometric, and environmental data). For example, an activity tracking device is configured to collect activity data such as steps taken, distance traveled, rate or pace of a run, and/or flights of stairs climbed, etc.; a heart rate monitor is configured to collect heartbeat data; a sleep tracking device collects data relating to how much time a user/wearer spends sleeping; a nutrition tracking device collects data relating to food and drinks consumed by a user; a smart scale collects data relating to a body weight, body fat percentage, and/or body mass index (BMI), etc. Furthermore, a smart watch and/or smart phone, may be utilized as an activity tracking device, a heart rate monitor, a sleep tracking device, and/or a nutrition tracking device.

The collected data is provided to one or more applications running on the user device 110 in real time. The applications may include heath-monitoring applications such as e.g., UA Record™, MapMyFitness®, etc. each owned by Under Armour, Inc. Other health activity related monitoring applications may additionally be utilized in connection with the present disclosure, such as those specifically designed to receive information from a particular health monitoring device (i.e., an application which is published by the device manufacturer); the foregoing being merely representative of the general concepts of the present disclosure. In one embodiment, the user device 110 reports the collected or sensed data to one or more user data servers 102.

In one specific embodiment, a central database may be utilized such as that described in U.S. Patent Publication No.: 2017/0208060, filed on Jan. 20, 2016, now issued as U.S. Pat. No. 10,158,632, entitled "Methods and Apparatus for Account Linking", incorporated herein by reference in its entirety. As discussed therein, a plurality of applications running on a user device or in communication therewith are able to share data. Specifically, a single user device is configured to run a plurality of heath-monitoring applications which collect data from a respective plurality of health-monitoring devices and/or via user entry; once the applications are linked, the user accesses, views, and analyzes the plurality of health-related data from the plurality of applications at a single application. In this manner, the user's activity and updated information entered, sensed, or otherwise collected into or by one application may be accessible at the other applications for analysis and display therein as well.

Referring again to FIG. 1A, the user data servers 102 store the collected/obtained/sensed data which is later accessed by an entity configured to generate a plurality of user profiles (e.g., the recommendation engine 104, curator apparatus 106, or other device). The user profiles include demographic and contact information relating to each user including e.g., age, gender, mailing or billing address, email address, etc. Additionally, the profiles may include aspects derived from the collected health-parameter data including e.g., activities/sports and/or celebrities of interest, weight, goals, etc. The user may be given an opportunity to confirm certain data in the user profile which was derived or obtained from the collected data via an on-boarding process (discussed elsewhere herein); alternatively, the user may manually enter certain data which cannot or is not derived from other collected data. Once generated, the user profiles are stored at a user and product profile database 116 in one embodiment. Alternatively, the user profiles may be stored at separate database than the product profiles (see FIG. 1B below).

The user and product profile database 116 is further configured to store a plurality of product profiles. The product profiles may be generated at e.g., the recommendation engine 104, or other entity in communication with the user and product profile database 116. In one embodiment, the product profiles are generated or extracted from a product catalog stored at the network 108. Each product profile comprises a table, matrix, or other plurality of records which describe aspects relating to individual ones of the available products. In one specific embodiment, the number, p, of aspects listed in each product profile corresponds to the number, m, of aspects of a user profile. In this manner, all of the product records may be filtered according to one or more user specific profile aspects. Other mechanisms for record comparison will be discussed in greater detail elsewhere herein. The results of the comparison are then provided to a human curator at a curator device 106 in the form of an ordered list of recommended products. Alternatively, only certain ones of the compared product records (i.e., those having a threshold level of similarity to the user profile aspects) are provided as recommended items to the curator. In another variant, the recommended items are provided to the curator in a sorted list by product category, such as tops, bottoms, shoes, accessories, etc.

Referring again to FIG. 1A, as noted above, the recommendation engine 104 comprises a server or other computerized apparatus configured to review an individual user profile against each of the available product profiles in order to recommend one or more of the available products based on similarity and/or provide a list of all products in order of most to least likely to be of interest for purchase by the user. The recommendation engine 104 is further configured to "learn" from at least one feedback mechanism.

Specifically, as noted above, the recommendation engine 104 (or other profile generating entity) utilizes existing product data records to generate or otherwise obtain (such as from another entity) a product profile record for each available product. Additionally, the recommendation engine 104 (or other profile generating entity) pulls basic user data (e.g., age, gender, weight, etc.), user activity data (including social media activity), and psychographic data from the user data server(s) 102 and/or user devices 110. This data is utilized by the recommendation engine 104 (or other profile generating entity) to generate a consumer profile record, which each user/consumer may confirm the contents of and/or make updates to during an account set-up or on-boarding process.

As noted above, the recommendation engine 104 generates recommendations (i.e., selects one or more of a plurality of products targeted to a specific consumer) by comparing each of the product records to the consumer's profile via a comparison algorithm. These recommendations are then presented to a curator or stylist at a curator apparatus 106. The stylist selects from among the recommended products one or more items for delivery the subscriber. Hence, a delivery order is created and provided to the product warehouse 112 for fulfillment (i.e., shipment of the selected products to the user's location 114). As will be discussed in greater detail elsewhere herein, the aforementioned selection and shipment may, in one variant, be made periodically in connection with a subscription service (such as a monthly subscription service).

The subscriber, upon receiving the recommended and curator selected products, selects which items to return and which to keep. Those items which the subscriber is not interested in purchasing are provided back to the product warehouse 112, which then processes the return of those items and the purchase of the items which were kept.

In one embodiment, the recommendation engine 104 (and/or other appropriate service) is further configured to utilize at least one feedback step to ensure that its recommendations are in line with the user's preferences. A first feedback mechanism comprises utilization of feedback received from a human curator at a selection or curator apparatus 106. As noted above, a list of recommended items are provided to the curator/stylist from the recommendation engine. When the human curator or operator makes a selection of one or more of the items in the list, information about the selection is provided back to the recommendation engine 104. In one variant, the curator may additionally provide detailed descriptive information relating to his/her reasoning for selected/not selecting certain products. The feedback information is used by the recommendation engine 104 to adjust at least one of the user profile, one or more product records, a comparison algorithm, and/or a threshold value for determining adequate similarity as discussed elsewhere herein.

A second feedback mechanism comprises utilization of feedback received from the user/subscriber. Specifically, as discussed herein, the items selected by the human curator are provided to a product distribution warehouse 112 as a purchase order or delivery order. The product warehouse 112 prepares and ships the selected products to the consumer location 114. Once the consumer receives the selected products, he or she is given a specified period of time within which to return those items the consumer does not want to purchase. In one variant, the consumer may additionally provide detailed descriptive information relating to his/her reasoning for selected/not selecting certain products. The returned items are received at the product warehouse 112, which reports back to the curator apparatus 106 and/or the recommendation engine 104 information relating to the returned products and/or the items which were not returned. The feedback information is used by the recommendation engine 104 to adjust at least one of the user profile, one or more product records, the comparison algorithm, and/or the threshold value as discussed below.

In a first embodiment, supposing an example in which feedback information is received that a subscriber did not wish to purchase Product A, the subscriber's profile is updated. In one instance, a weighted product record is created by multiplying the product record for Product A by a predetermined weighting factor corresponding to the return activity, then adding the weighted product record to the most recent profile for the user to create an updated user profile. In another instance, the specific aspects of user's profile which correspond to the most influential or representative aspects of the product record for Product A are decreased by a value predetermined to correspond to the product return activity.

In another embodiment, the product record itself is adjusted. According to this embodiment, the weighted product record is created, then such product record is used in any subsequent comparisons of that product to that or any other user's profile. In addition, other product records meeting at threshold level of similarity to that of Product A may be identified and likewise updated/weighted. Various mechanisms may be used to determine similar products to Product A including, e.g., utilizing metadata or other tags to the product records to identify a product or sport line, a filtering mechanism similar to that used to determine closeness of products to a user profile, etc.

In yet another embodiment, the comparison algorithm itself may be updated in response to the first and/or second feedback. In one embodiment, this may include e.g., adding, subtracting, multiplying, dividing, or other performing any other mathematical operation with a predetermined value that corresponds to the return activity to the comparison.

In a further embodiment, the similarity threshold may be adjusted in response to the first and/or second feedback. That is, rather than recommending products having a first similarity tolerance, the recommendation engine 104 may adjust the threshold to a number just above the similarity level that was determined for the returned product, Product A. In the instance a plurality of products are returned, the recommendation engine 104 may use the lowest or highest similarity level of all of the returned products to adjust the threshold in the manner outlined above.

Additionally, the foregoing first and/or second feedback mechanisms may be utilized by a computerized apparatus (e.g., the recommendation entity 104) to identify generalizations within groups. For example, the feedback information may indicate that women within the 18-25 demographic have a higher rate of returning a particular pair of running tights as compared to women in the 26-35 demographic. In another example, it may be determined that people in the ZIP code 78701 maintain a consistent and high rate of keeping a particular pair of running shorts irrespective of a sport seasonality thereof. These generalizations may then be applied by the recommendation engine 104 to future recommendations.

User-specific patterns may also be derived given the feedback information. For example, it may be determined that for a particular user any items which are brightly colored are kept whereas solid color items are kept less often. In another example, it may be determined that the user will not purchase anything priced above $50.

Patterns may further be derived from information relating to the combination of the particular items that the curator sends and those items which are kept or sent back by the subscriber. Specifically, patterns may be used to identify whether the curator selecting high/low rated items (as recommended by the recommendation engine) and may further give useful information relating to the rate of success of the curator in these types of selections (highly vs. lower rated items).

As discussed above, the curator apparatus 106 may, in one embodiment, be further configured to receive consumer feedback from the product warehouse 112. Specifically, the curator apparatus 106 may utilize the consumer feedback information to assist the curator him/herself in making future selections (i.e., human learning). Moreover, the human curator may (via an interface at the curator apparatus 106) communicate directly to the consumer about his/her selections. It is further noted that such interface and communication may be utilized by the curator to communicate with the consumer prior to making a selection of particular ones of the recommended items as well. The consumer feedback information is used by the recommendation engine 104 to adjust at least one of the user profile, one or more product records, the comparison algorithm, and/or the threshold value in a manner similar to those discussed above.

Figure 1B:
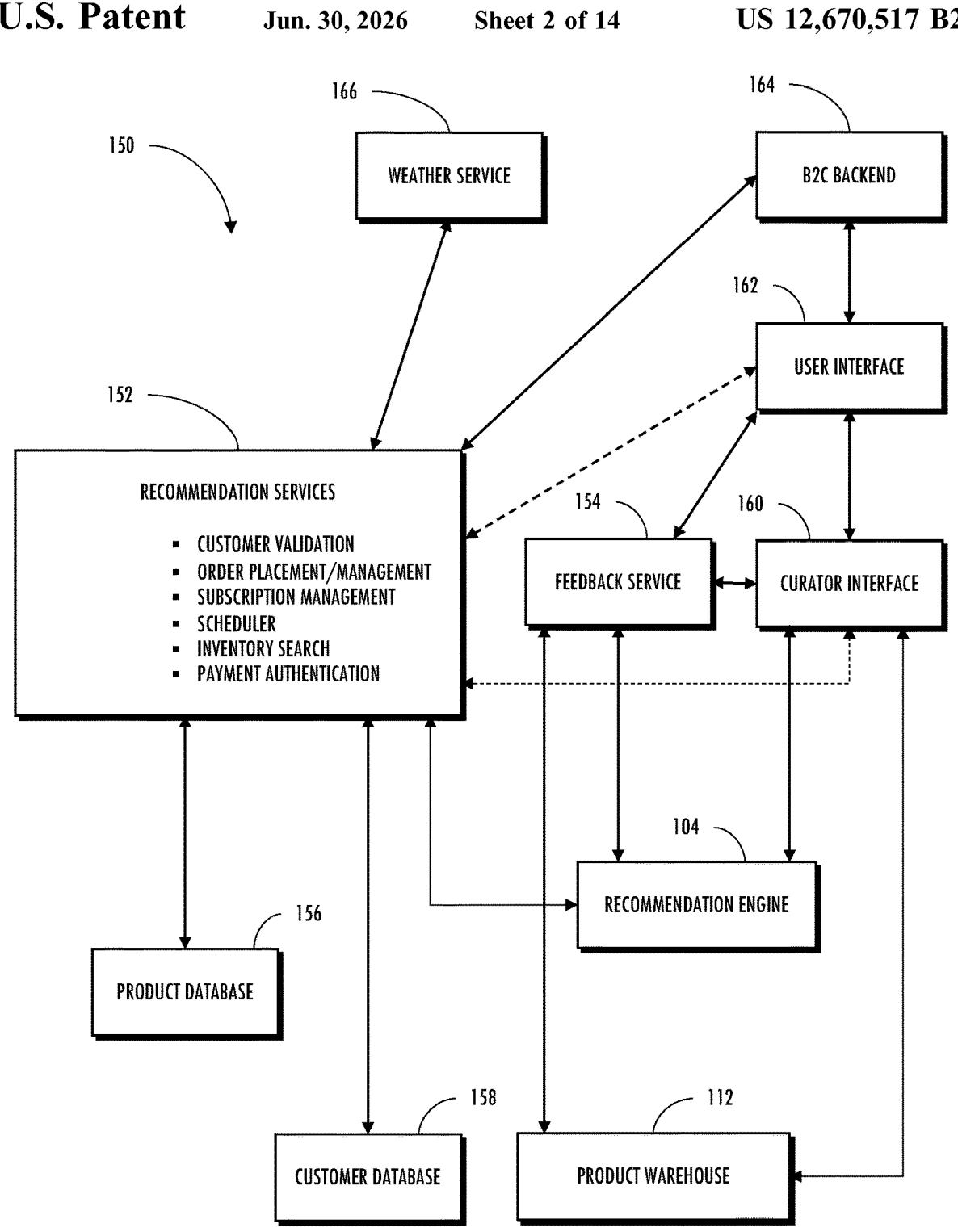
FIG. 1B is a block diagram illustrating another embodiment of an exemplary network for providing enhanced product recommendations in accordance with the present disclosure.

Referring now to FIG. 1B, a detailed embodiment of an exemplary network 150 for use with the present disclosure is shown. As illustrated, various services and entities are provided which cooperate with one another to provide the herein described functionality. Specifically, the network 150 includes a recommendation engine 104 which utilizes one or more algorithms for determining which of a plurality of products in a product database 156 are suitable for recommendation to a particular customer. The recommendations may additionally be affected by weather conditions associated to a location of a customer obtained from the weather service 166. Alternatively, or in addition, the weather conditions provided by the weather service 166 may be utilized by a curator at the curator interface 160 via the recommendation service 152.

A plurality of recommendation services 152 enable a curator to receive the recommendations from the recommendation engine 104 and, in one embodiment, enable the curator/stylist to select one or more items from among the recommended items as well as any other additional or alternative items to be delivered to the subscriber (as discussed in greater detail below). The recommendations services 152 further enable a consumer to access his/her account as is discussed in further detail elsewhere herein.

Once products are selected, an order for the products is generated and provided to the product warehouse. The product warehouse is responsible for packaging and delivering the products to the subscriber. Items which the subscriber elects to keep are billed to the subscriber's account and the product warehouse processes returns for the items which the subscriber does not keep.

Information relating to those items which were/were not selected by the curator/stylist and information relating to the items which the subscriber kept/did not keep is provided, in one embodiment, to the recommendation engine 104 via the feedback service 154. The recommendation engine uses the feedback information to enhance its recommendation algorithm.

As noted above, various recommendation services 152 are provided which provide the necessary infrastructure for enabling a subscription-based automatic delivery of recommended products, including, e.g., a customer validation service, a payment authentication service, an order placement and management service, subscription management service, a scheduler, and an inventory search service. Additional services to provide the herein disclosed functionality which are not specifically referenced here and which would be known to those of ordinary skill in the art may also be provided, the foregoing are merely exemplary of the general concepts of the disclosure.

The customer validation service comprises a means by which information may be obtained about a customer. For example, the customer validation service may be configured to communicate with a customer database 158 in order to obtain preliminary information about a customer when he/she begins a set-up or onboarding process (discussed elsewhere herein). In this manner, information about the user may be preloaded to decrease the burden on the customer him/herself in having to manually enter the information. For example, it may be determined that the customer is a female interested in running and yoga. In one embodiment, the customer database may be of the type discussed in the previously referenced U.S. Patent Publication No.: 2017/0208060, filed on Jan. 20, 2016, now issued as U.S. Pat. No. 10,158,632, which enables information to be shared across multiple user accounts. Customer address and payment information may also be stored at the customer database 158 and accessible by the customer validation service. Additionally, the customer validation service may validate a user's password and login credentials upon subsequent login attempts once the user has completed the on-boarding process and established an account.

The payment authentication service enables a consumer's payment information (whether entered manually or obtained from e.g., the customer database 158) to be verified. Payment authentication may be accomplished via well-known credit card validation mechanisms, omitted from this discussion.

The order placement and management service comprises a means for enabling a customer to place an order (such as an order for a subscription service to begin), enabling a curator or stylist to order specific products from among the recommended products to be delivered to the subscriber, generating order receipts based on the curator ordered items, and adjusting orders according to user returns so as to properly bill the user only for those items which he/she keeps (does not return).

The subscription management service provides a means by which the subscriber may make changes or updates to his/her subscription. For example, the subscriber may change his/her delivery preferences including delivery frequency (e.g., weekly, monthly, bi-monthly, every six months, etc.), and shipping address, etc. In addition, the subscriber may be able to, via the subscription management service, access his/her style profile and make adjustments. In other words, as the customer is on-boarding, a profile is created which reflects the customer's style inclinations (as discussed in greater detail elsewhere herein) and stored at the customer database 158. Later, the customer may, using the subscription management service, access this profile and enter updates. For example, the user may enter new sports of interest, a preference for a certain type of clothing (e.g., more basketball shorts), color and pattern preferences, etc.

The scheduler comprises a service by which timed events are managed. For instance, the curator/stylist may be notified of an upcoming deadline, such as a deadline to select a particular subscriber's recommended items. The scheduler also enables the subscriber to enter a schedule for delivery of the recommended items and/or follows the delivery instructions set forth by the customer via the order management service (discussed above). The scheduler may also manage dates on which shipments were sent and received, and keep track of a number of days in which the customer has to return any items from a recent delivery.

The inventory search service enables the curator to search the entire inventory of available products. The stylist may do so when he/she determines that the computer provided (i.e., recommendation engine 104 provided) list of recommended products are insufficient. In this case, the stylist may find items which are similar to the recommended items, search for a specific item, and/or search using any number of filters. As will be discussed in greater detail below, the inventory search service may also be utilized in coordination with the recommendation engine to enable the recommendation engine to search the same inventory for a computer determination of recommended available products.

The customer interacts with the recommendation services 152 via user interface 162. In one embodiment, the interface 162 is accessed by the customer via a user device 110 in communication with the recommendation services 152 via a network 108. The interface 162 may comprise a web page or website into which the customer enters in order to, inter alia, view or update his/her account, manage his subscription, schedule delivery of his curated items, and communicate with his/her assigned stylist. Various interactions of the customer with the recommendation services 152 further utilize a business to customer (B2C) backend 164, as discussed elsewhere herein.

Specifically, when a user first enters the site, an on-boarding process is initiated. In one variant, certain questions are presented to the consumer which establish an account for the user. The answers to the questions may be preloaded such as from information saved elsewhere (e.g., the customer database 158). Alternatively, or in addition, the customer may enter answers to individual ones of the questions manually. The questions may include gender, gender identity, types of exercise or sports in which the consumer participates, typical locations for the customer's activities or sports (e.g., outside, in a commercial gym, at home, etc.), individual style and/or fashion likes/dislikes, celebrities and/or sports figures the customer follows or has interest in, sizes (tops, shoes, hats, bottoms, etc.), and so forth.

Once the account is created, the subscriber can log-in by providing a password and user identifier combination. Upon validation of the password/user identifier combination, the user is provided with an interface 162 to view his/her account details. The account details may include saved payment methods, style profile (including sizes, preferences, etc.), assigned stylist, delivery schedule, delivery address as well as a mechanism to view previously recommended/ delivered products, previously purchased products, and to communicate to the assigned stylist. The subscriber may further rate items and/or otherwise provide feedback relating to products which were previously delivered, as well as other products available for purchase.

In a further embodiment, one or more of the pages which a subscriber may view comprises a display of information received from one or more linked applications. For example, data may be obtained at the user device 110 relating to health parameter (e.g., activity, steps taken, sleep, calories burned and/or ingested, body weight, etc.); the device 110 may run a health-monitoring application which generates a display relating to the collected user health parameter data. In one embodiment of the present disclosure, this display may be re-produced at the user interface 162, such as via the apparatus and methods disclosed in previously referenced U.S. Patent Publication No.: 2017/0208060, filed on Jan. 20, 2016, now issued as U.S. Pat. No. 10,158,632, which enables account linking. In one such case, the recommendations services 152 are able to access the health-parameter data at a linked database (such as the customer database 158).

The curator/stylist interacts with the recommendation services 152 via the curator interface 160. In one embodiment, the interface 160 is accessed by the curator via a curator apparatus 106 in communication with the recommendation services 152 via a network 108. The interface may comprise a web page or website into which the curator enters in order to, inter alia, view or manage his/her list of customers, to direct ordering of recommended items for each consumer he/she curates, and communicate with his/her customers. Exemplary curator interface 160 are illustrated at FIGS. 2A-2B and discussed below.

Similar to the subscriber set up discussed above, in one variant, each stylist/curator must also establish a profile or account. The stylist profile comprises publicly reviewable information including e.g., sports, activities, gender, a photograph, contact information, including links to "friend" the stylist on certain social media sites, and/or other relevant information about the stylist. According to this embodiment, the stylist also creates a password and user identifier combination for log-on. Upon validation of the password/user identifier combination, the stylist is provided with an interface 160 to view his/her account details. In one variant, the stylist is first brought to a task page which lists any outstanding tasks to be completed by the stylist. For example, the task list may indicate one or more subscribers for which selections from among the computer recommendations are needed so that delivery thereof may be completed. In another example, on the task list may indicate one or more selected items for delivery are no longer in stock or available. The task list may further indicate the stylist's progress on certain ones of the tasks on the list, e.g., recommendations begun/incomplete.

Exemplary Interface

Figure 2A:
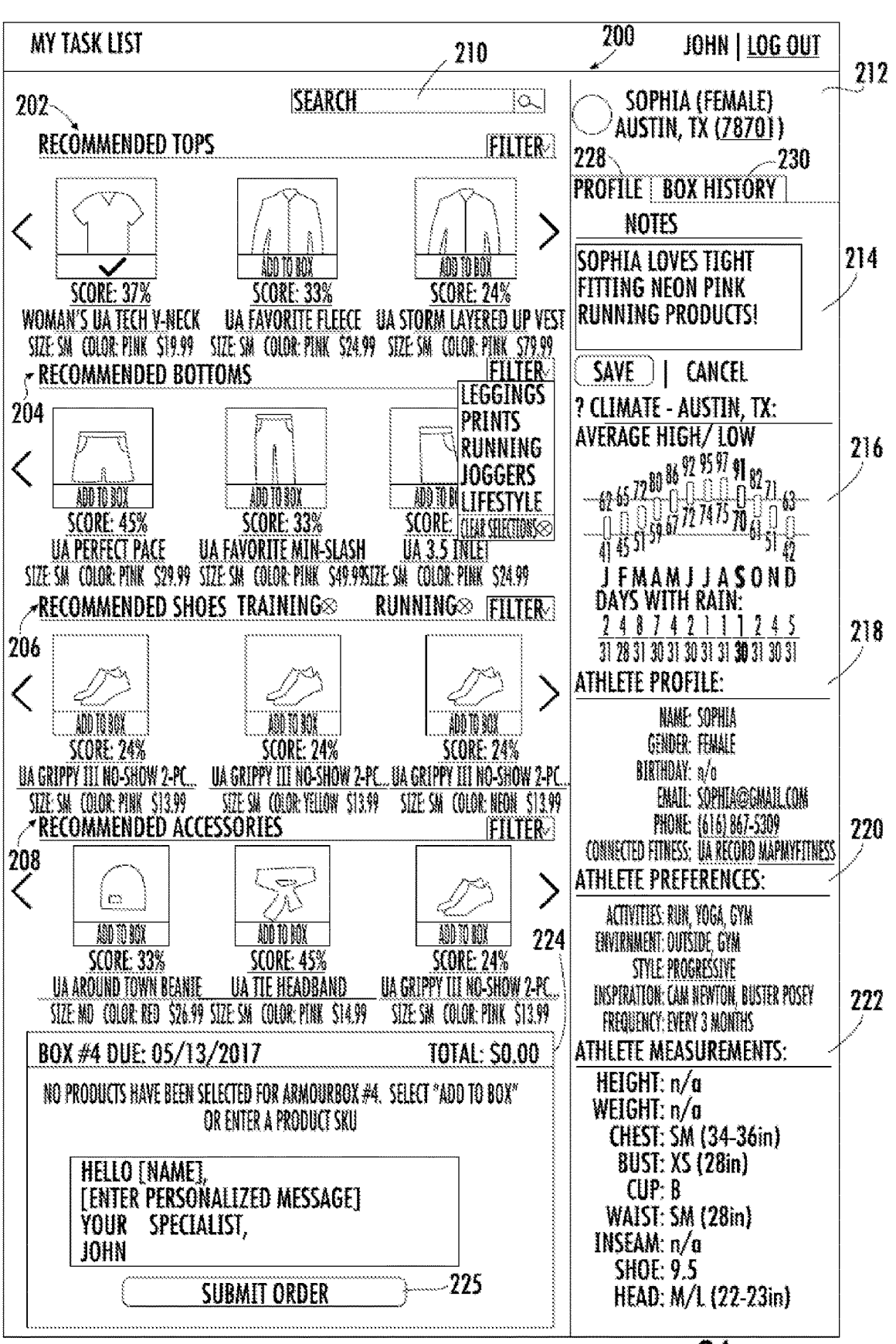
FIGS. 2A-2B are graphical illustrations of various pages of an exemplary curator interface for use in providing enhanced product recommendations in accordance with one embodiment of the present disclosure.
Figure 2B:
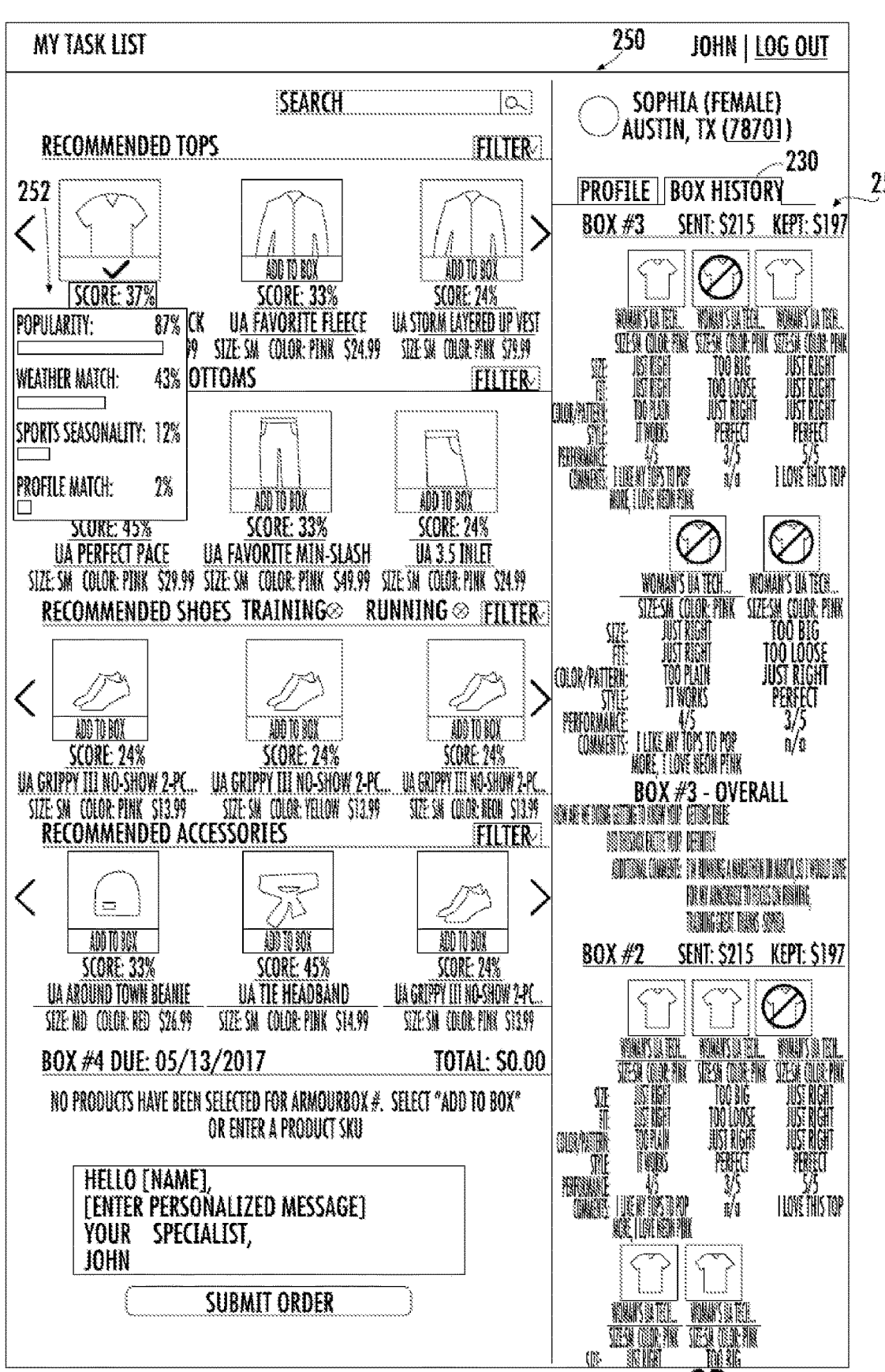

Referring now to FIG. 2A, an exemplary curator interface 200 for enabling the curator to view computer generated recommendations is given. As shown, the interface generally comprises a first panel which lists the computer-generated recommendations (i.e., generated at the recommendation engine 104) and a second panel which gives subscriber details.

Specifically, the first panel (shown on the left portion of FIG. 2A) of the illustrated interface 200 includes a plurality of sections relating to computer-generated (i.e., recommendation engine 104 generated) recommendations, including: a "Recommended Tops" section 202, a "Recommended Bottoms" section 204, a "Recommended Shoes" section 206, and a "Recommended Accessories" section 208. Additional, other recommendation-related sections may be provided, the foregoing being merely exemplary of the general concepts of the present disclosure.

Each of the foregoing sections 202, 204, 206, 208 comprises a scrollable list of products (e.g., tops, bottoms, shoes, and accessories, respectively) selected by the recommendation engine 104 as being related to a subscriber's profile. In one embodiment, every product is listed in order of similarity or relevance to the subscriber's profile. Alternatively, only a given number of the top or best matches are provided in the scrollable list. As illustrated by the check mark in FIG. 2A, the curator/stylist is able to scroll through the recommended tops 202 in order to find one or more which are selected in order to be added to a "box" to be delivered to the subscriber. In the illustrated embodiment, a score for each item is provided along with a short description, price, and image. Score calculations will be discussed elsewhere herein.

In one embodiment, one or more rules may be applied to the curator's selections via a rules engine (not shown). For example, the interface 200 may limit the total number of items which may be selected. In another alternative, the limit may be placed on the sections, e.g., some set number of tops, bottoms, shoes, and accessories are required. In addition, the rules may have a temporal requirement, for example, running shoes are only permitted for inclusion in a subscriber's box when more than 2 months have passed since the last running shoe purchase by the subscriber. Other rules which set a minimum and/or maximum total value for a curator's selections and/or a per item minimum and/or maximum may also be given. Any combination and required number of items may be set in the rules applied at the interface 200.

The scrollable sections 202, 204, 206, 208 may be further filtered via a dropdown filter menu 226. In the illustrated embodiment, the recommended bottoms 204 may be filtered by e.g., leggings, prints, running, joggers, and lifestyle. It is further appreciated that the recommended tops 202 may be filtered by sports bras, sleeveless, long sleeved, t-shirt, compression, etc. Recommended shoes 206 may be filtered by e.g., running, cross training, hiking, boots, casual, colors, etc.; recommended accessories 208 may be filtered by e.g., hats, headbands, socks, bags, etc.

The second panel (shown on the right portion of FIG. 2A) includes a plurality of sections relating to the athlete/ consumer (e.g., subscriber) him/herself, including: a general customer information window 212, various windows within a subscriber profile tab 228. Additional, other subscriber-related sections may be provided, the foregoing being merely exemplary of the general concepts of the present disclosure.

The general customer information window 212 provides a minimal amount of information for the stylist to recognize the consumer. In the given example, the stylist is provided with the subscriber's name, gender, and generalized geographic location (e.g., Sophia, female, Austin, Tex.). Below the general customer information window 212 are a profile tab 228 and a box history tab 230. The contents of the profile tab 228 are illustrated in FIG. 2A, the contents of the box history tab 230 are illustrated in FIG. 2B (discussed below).

The subscriber profile tab 228 includes a notes window 214, a climate indication window 216, a customer/athlete profile window 218, a customer/athlete preferences window 220, and a customer/athlete sizing/measurement window 222. The notes window 214 comprises a window in which the stylist may enter and save text and/or image notes relating to interactions with the consumer, noted patterns or preferences of the consumer, etc. The climate indication window 216 illustrates to the stylist the typical weather for the geographic location of the subscriber. In the given example, for the month of September typically the weather ranges between 70-91° F. in Austin, Tex. Additionally, it is illustrated that in Austin, Tex. in September there is typically 1 day in 30 in which it rains. Although, climate/weather is taken into account, in one embodiment, by the recommendation engine 104 when the recommended products are selected (see discussion below), it is appreciated that the stylist may further consider this information when selecting products from among the computer-selected items.

The customer/athlete profile window 218 lists basic aspects relating to the subscriber including e.g., the name, gender, birthday, email address, phone number, and connected applications (such as UA Record™, MapMyFitness®, etc.). The customer/athlete preferences window 220 provides information relating to various activities, styles, etc. which may assist the curator in selecting products. In the illustrated example, the specific preferences include e.g. activities, environment (such as gym workouts, outdoor workouts, etc.), a style identifier (e.g., classic, progressive, edgy, etc.), inspirational celebrities/athletes, and frequency (e.g., monthly, every three months, every six months, etc.). Finally, the customer/athlete sizing/measurement window 222 provides the curator with specific information relating to the subscriber's specific sizing information. In one embodiment, a subscriber's specific measurements may be provided. Alternatively, the user's general sizing information may be provided (as illustrated). Specifically, in the embodiment of FIG. 2A, the subscriber's height, weight, chest, bust, cup, waist, inseam, shoe and head sizes are listed. In a further embodiment, as discussed in greater detail below, changes to a user's sizes may be made by the curator in response to reported weight loss goals being met (and recorded in a connected application).

Each of the foregoing windows 214, 216, 218, 220, and 222 may further provide alternative or additional information (not illustrated); the illustrated embodiment being merely exemplary of the general concepts of the disclosure.

Lastly, the exemplary interface 200 of FIG. 2A includes an order summary window 224 (shown on the bottom left portion of FIG. 2A). The order summary window 224 provides a summary of the products selected by the curator as they are added to the subscriber's box, a running total price for the items in the subscriber's box, and a window within which the curator may leave a personalized message to the subscriber regarding the contents of the box, such as why certain items were selected, etc. Once the curator has selected a sufficient number and type of items for the subscriber's box (as determined by the aforementioned rules), and entered a personalized message for the subscriber, the curator uses the "submit order" button 225 to cause a delivery order to be generated and provided to the product warehouse 112 for fulfillment. In addition, an electronic message may be sent to the subscriber including the contents of the order summary window 224.

Referring now to FIG. 2B, a drop down menu 252 which provides computer-generated scores on which product matching is performed is illustrated. As shown, the item of FIG. 2B was determined to have an overall score of 37%, which is comprised of several score modules including in this example, an 87% popularity score, a 47% weather matching score, a 12% sports seasonality score, and a 2% profile match. The popularity, weather, sports seasonality and profile match scores are derived by the recommendation engine 104 as discussed elsewhere herein. A visual representation of the individual score modules may be provided such as e.g., using colors, a bar graph, etc. When determining the overall score for the product and in selecting certain products for display and/or a priority or hierarchy thereof, the recommendation engine 104 applies a weighting scheme to each of the foregoing score modules. For example, the weighting scheme may provide that e.g., profile matches are weighted at 4×, sports seasonality and popularity are weighted at 2×, and weather matching is weighted at 3×; other weighting schemes may also be applied, the foregoing being merely exemplary. Additionally, the weighting schemes may be dynamically modulated or modified based on feedback information from e.g., the stylist and/or customer. In another embodiment or alternative, weighting may be performed on a per-subscriber basis. For example, it may be noted that for a particular user, price is the most important factor in determining whether an item will be kept. Hence, price may comprise a separate score module which is highly weighted (e.g., weighted at 5×). Still further, each demographic may have a predetermined set of weights which are applied to the score modules discussed herein. A detailed discussion of the score module and sub-module calculations and weighting schemes will be discussed in greater detail elsewhere herein.

Additionally, FIG. 2B illustrates the exemplary customer/athlete history panel 254 which is displayed to the curator when he/she selects the box history tab 230. As shown, the history panel provides a per box summary of each item provided to the subscriber. The summary may indicate total price for the box, price for only the items which were purchased from the box, the item descriptions and images, whether each item was kept or returned, as well as reasons for the subscriber's decision to keep or to return the item. The reasons for returning and/or keeping the items may include a description of the subscriber's feeling for the size, fit, colors, and style of the items, as well as score in a rating system (e.g., 4 out of 5, stars, etc.). Finally, the consumer may provide text notes and/or uploaded images relating to the product.

In another specific implementation, data relating to the user's physical activity data, nutrition, and/or social networking may be obtained from e.g., one or more user data servers 102, user devices 110, customer database 158, and/or other entities configured to store such information (e.g., the previously referenced databases described in U.S. Patent Publication No.: 2017/0208060, filed on Jan. 20, 2016, now issued as U.S. Pat. No. 10,158,632). The data relating to the user's physical activity, nutrition, and/or social networking is displayed to the curator (not shown). In this manner, the curator may review the user's most recent patterns of behavior in order to make determinations relating to the curated items. For example, the curator may identify that the user's activity of running generally takes place in the evenings, which are generally colder than the average temperatures for a geographic region which are used by the recommendation engine (noted elsewhere herein). Hence, the curator may select warmer clothing items, hats and/or jackets which might not have been as highly recommended by the recommendation engine.

Exemplary Methodology

FIGS. 3A-3F below describe methods which utilize the foregoing network 100 and/or 150 to enable enhanced recommendations in accordance with the present disclosure.

Figure 3A:
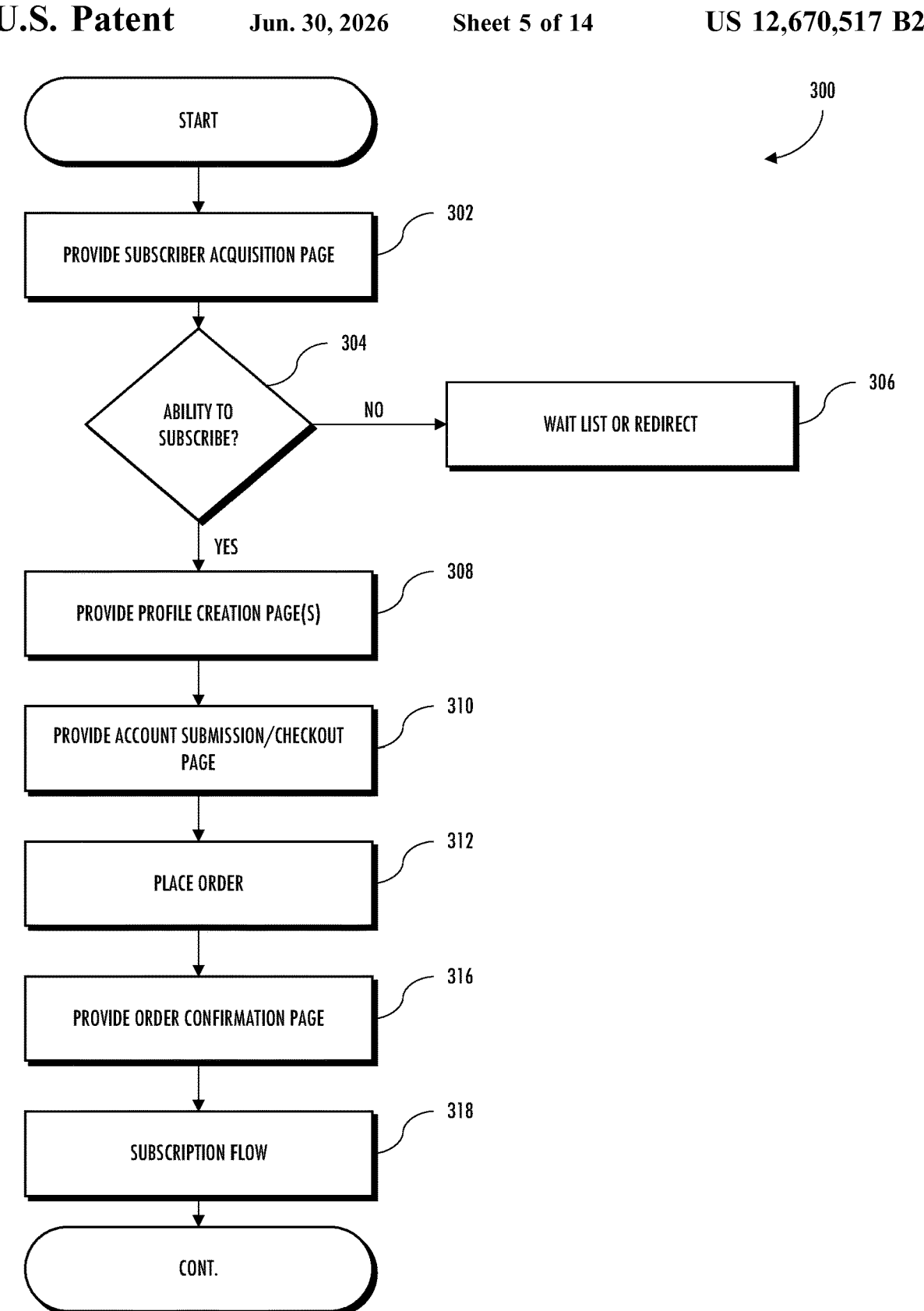
FIG. 3A is a logical flow diagram illustrating a generalized method for enabling a subscriber to create a subscriber account in accordance with one embodiment of the present disclosure.

Referring now to FIG. 3A, a generalized method 300 for enabling a subscriber to create a subscriber account (referred to herein as "on-boarding") is illustrated. As shown, per step 302, the consumer is provided with a subscriber acquisition page. In one embodiment, the subscriber acquisition page comprises a web-based page or application screen which invites a customer to sign up for enhanced recommendation services. The subscriber acquisition page is provided on a user interface 162 using e.g., B2C backend services 164 in coordination with recommendations services 152. In one variant, the enhanced recommendation services may comprise a subscription service for periodically providing customers with one or more curator selected products from among a plurality of computer recommended items. Alternatively, the recommendations services may create virtual boxes from which the customer him/herself may select items for purchase.

Next, per step 304, it is determined whether the customer is able to subscribe to the recommendation service. For example, a customer may not be able to sign up for the service if there is no available curator to which the customer may be assigned (i.e., the current demand is higher than the current number of curators are able to service). In this case, the customer will be placed on a waiting list (step 306) until there is sufficient bandwidth to service their account. In another example, a particular customer may not be able to sign up for the service if it is determined that the user has already enrolled in the program. In this case, the user may be redirected to an account log-in page (step 306). In one exemplary embodiment, the determination at step 304 is accomplished via the recommendations services 152 performing a search of the current customer database 158 for information identifying the would-be subscriber to determine whether the customer has already established an account. Additionally, or in the alternative, the recommendation services 152 may search one or more stylist backlog lists to determine whether there are any stylists available and/or determine whether a predetermined number of subscriber slots that can be accommodated have already been filed.

When it is determined that the user is able to subscribe to the recommendation service (at step 304), then the method 300 proceeds to step 308 where the customer is provided with one or more profile creation pages. The profile creation pages may comprise web-based or application pages which ask the customer a series of questions relating to e.g., activities, preferences, demographics, etc. of the customer. The profile creation pages are provided via coordination between recommendation services 152 and the B2C backend 164. In one variant, answers to certain ones of the questions may be pre-loaded into the pages. For example, the recommendations services 152 may pull data relating to the customer and his/her activity from the customer database 158 and/or user data servers 102. In this manner, the page may pre-load e.g., that the customer is a female, interested in yoga and running, and follows the University of Maryland Terrapins college football team. The customer may verify and/or modify the preloaded information and/or provide additional answers/information at the creation pages of step 308.

Once the profile creation page(s) have been adequately filled in, per step 310, an account submission/checkout page is provided. In other words, the account creation may include a step for the customer to enter a frequency for receiving a box of curator selected and computer recommended products. Accordingly, payment information is collected and other information required for processing payment (e.g., billing address, delivery address, etc.) at step 310 and the customer is invited to review his/her order prior to its submission. The customer validation service, subscription management service, scheduler service, and payment authentication service of the recommendation services 152 may each be utilized to facilitate accounts submission and checkout. The customer confirms the order and details, and the order is placed at step 312. To confirm the subscription request, an order confirmation page is presented to the customer at step 316. The order confirmation page may provide certain details relating to the order including e.g., a confirmation number, account number, profile name and other details relating to the customer and/or payment method. The method continues at step 318 to the subscription flow wherein various services of the recommendation services 152 perform steps necessary to enable the subscription (e.g., the subscription management service, the scheduler service, and the order placement/management services).

Figure 3B:
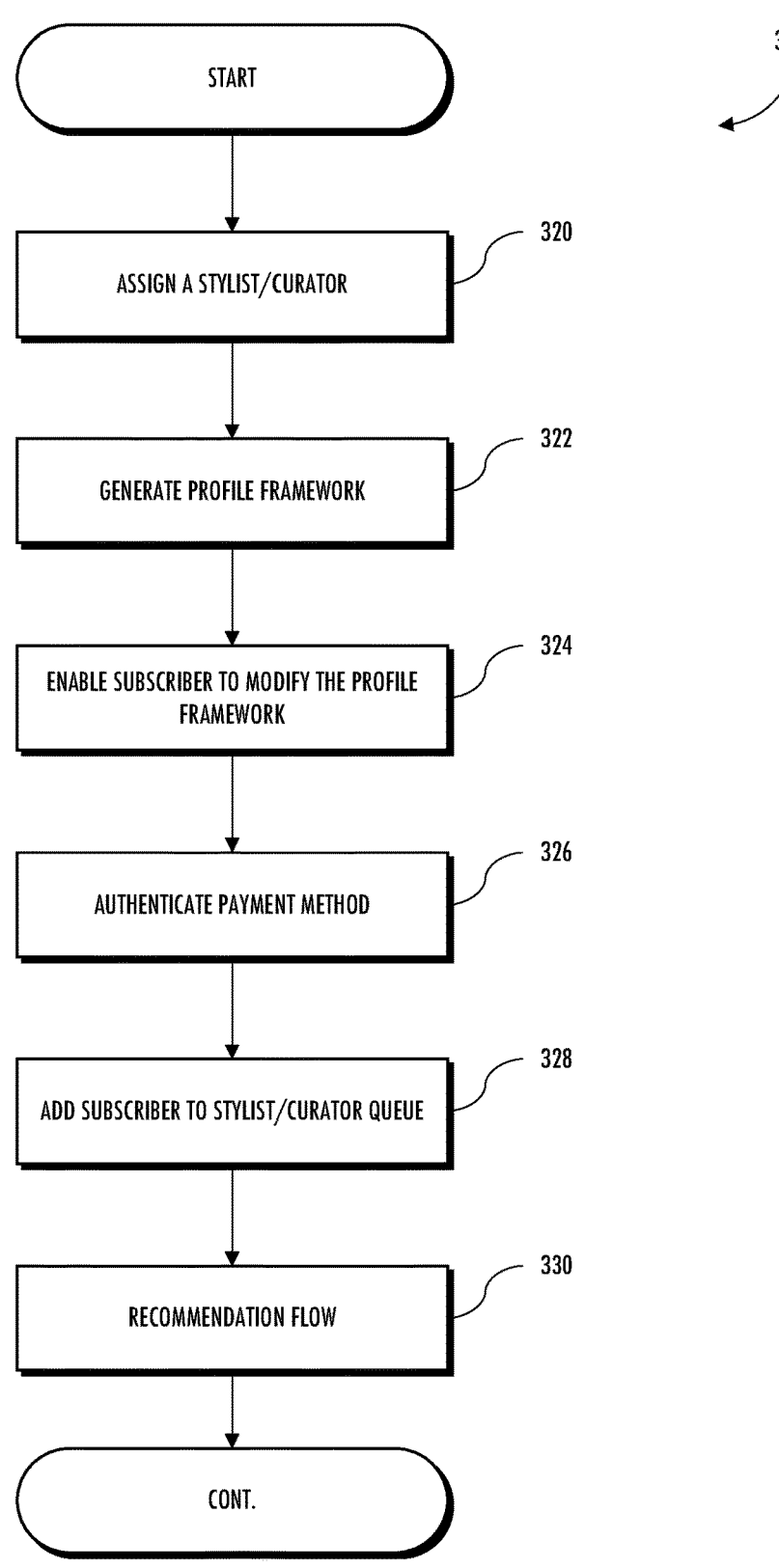
FIG. 3B is a logical flow diagram illustrating a generalized method for establishing a subscription for receiving curator-selected and computer-recommended products in accordance with one embodiment of the present disclosure.

FIG. 3B illustrates an exemplary subscription flow method 318. As shown, per step 320, a curator is assigned to the new customer/subscriber. This may be accomplished, in one embodiment, by a scheduler, subscription management, or other service at the recommendation services 152 matching certain user profile details to those of the curator (e.g., gender, sports/activities, etc.). Alternatively, a curator may be assigned based on availability, current workload, or a simple next curator in line process. As noted above, rules may be provided for how many active subscribers each curator may be assigned.

Next, per step 322 a profile framework is created using e.g., the information entered by the customer during the on-boarding process. The profile framework is utilized to create an account landing page into which the customer may log-in and modify as necessary (step 324) via coordination between the B2C backend 164 and recommendation services 152. For example, during the onboarding process the customer may have omitted to enter certain information, the profile framework is set up and the information may be highlighted as requiring user input/update/modifications. In other words, the profile framework may set a placeholder for unknown information. A profile framework may also be useful when a subscriber has started, but not completed, his or her on-boarding process. In addition, if not performed previously, the customer's payment method is authenticated at step 326 via a payment authentication service at the recommendation service 152 backend.

Once payment by the subscriber is authorized, per step 328, the subscriber is added to the assigned stylist/curator's queue (via the subscription management and/or scheduler service) and recommendations are generated via step 330.

Figure 3C:
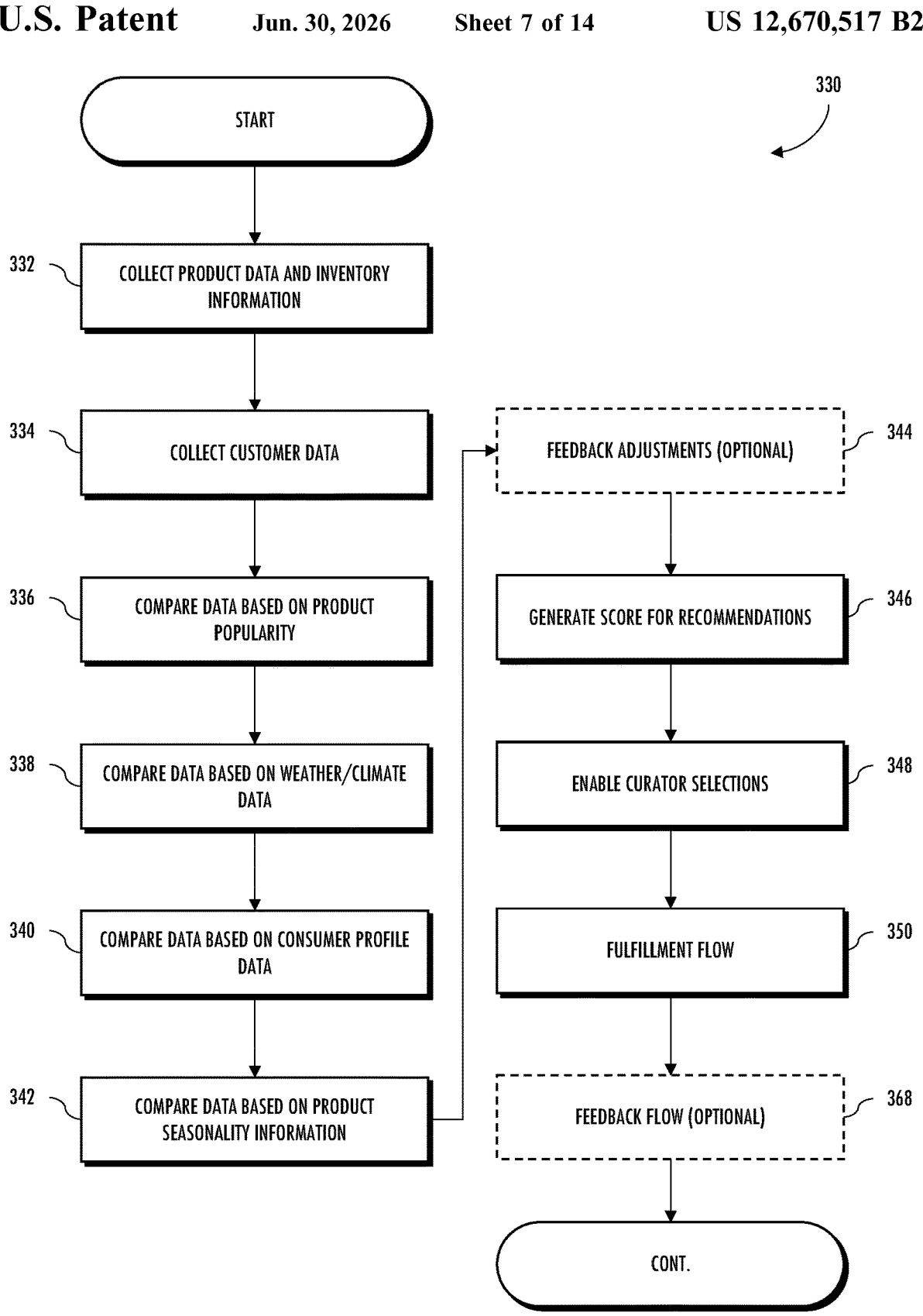
FIG. 3C is a logical flow diagram illustrating a generalized method for providing enhanced computer-recommendation of products in accordance with one embodiment of the present disclosure.

Referring now to FIG. 3C, a method 330 for providing enhanced computer-recommendation of products is given. As shown, per step 332, product data and inventory information is collected. In one embodiment, this data/information may be collected by the recommendation engine 104 from e.g., the product database 156 and/or the user and product profile databases 116. At step 334 customer data is collected by the recommendation engine 104 from e.g., the customer database 158 and/or the user and product profile databases 116. As noted elsewhere herein, the collected product data may include previously generated data records relating to the products which are placed in a format similar to consumer profile data records; in this manner, the product and consumer records may be easily compared. As also discussed elsewhere herein, the customer profile or data records may be prepopulated using information obtained about the customer from e.g., other linked applications, such as health-parameter monitoring applications and/or via the user data servers 102. In addition, the customer profile records may be updated periodically and/or consistent with changes or updates by the customer at the linked applications.

Various comparison calculations are provided at steps 336-342, it is appreciated that the listed comparison calculations may be performed in any order and/or additional or other comparisons may be included as well, the foregoing being merely exemplary. In other words, the score modules discussed herein (steps 336-342) are modular such that score modules may be added and/or removed as needed. Additional modules may include, e.g., a popularity of products among curators, a multiple item score (i.e., which items are more likely to be purchased together), item price, combined shipment price, etc. For example, a module may be provided which takes into consideration reviews of products (star ratings and/or natural language processing of text reviews) from ecommerce or online purchases. Another module may account for popularity and/or product rate of return or reviews at non-online retailers (i.e., so called "brick and mortar" stores). Finally, a module may be provided which is able to draw conclusions about a user's overall health from a plurality of collected data, including data related to e.g., sleep, activity, fitness, nutrition, etc. In addition, the herein discussed calculations and comparisons are performed at the recommendation engine 104 or an apparatus in communication therewith in one exemplary embodiment.

In the illustrated embodiment, at step 336, the product data is examined for popularity to determine an overall popularity of each product. The product popularity may be displayed to the curator (as in the embodiment of FIG. 2B) and/or may be used in determining an overall recommendation score of the product. The information needed to provide this comparison or calculation may be obtained from data generated by the product warehouse 112 relating to returns and stored or processed at e.g., the feedback service 154. In one variant, the examination may include a determination of the probability that the particular item when delivered in connection with a subscription service will be purchased (i.e., not returned). This examination may be further dissected or filtered by time of year, gender, age, geographic location, etc. For example, it may be determined that females over 45 who receive Product A have a 67% probability of returning the item.

In another variant, popularity (at step 336) may be determined based on inventory data. That is, the recommendation engine 104 (or other entity in communication therewith) is configured to determine a number of days a product has been available for purchase, and a corresponding relative demand for the product over a time period, e.g., in the last month, in its first month of availability versus the current month's sales, in order to predict a popularity score for the product. The popularity score may also be provided to the curator as illustrated in FIG. 2B.

In yet another variant, popularity may be made per-quarter such that items which are determined by the business to be "key items" (i.e., heavily promoted items) are weighted more heavily. Alternatively or in addition, items for which there exists a higher than average inventory may be weighted more highly in an effort to sell these excess items.

In another variant, popularity may utilize a Naïve Bayes model to determine probability a purchase will be made given a products particular attributes and past transactions of this or other users. In the herein provided attributes may include a set of product features/tags associated with each item, e.g., football, loose fit, all season, etc. The particular user's affinity for a given set of attributes may be cross referenced to the product features. Alternatively, it may be derived that a particular user is more likely to have purchases which align to those of other, similarly situated users. The similarity of this user to others may be determined based on demographics, past purchases, profile similarity, etc.

At step 338, the product data is compared to weather/climate data to determine an appropriateness of each product to the weather/climate where the consumer will make use of the product. In one embodiment, this is performed at the recommendation engine 104 which first determines a geographic location of the customer and then accesses data from a weather service 166 for that geographic location. In one variant, the geographic location of the customer is determined based on a zip code entered with the user's billing address or mailing address and accessed from customer data, records or a profile stored at the customer database 158, user and product profile databases 116, and/or user data servers 102. In another variant, a global positioning system (GPS) within the user device no or internet protocol (IP) address may be accessed in order to determine a current physical location. Next, the weather data is obtained from an appropriate data source, the weather data may include e.g., average temperatures and average precipitation levels. Finally, the weather data for the particular geographic location is compared against the product data. In order to accomplish this comparison, in one embodiment, the product data may include climate and/or weather appropriateness identifiers. For example, a particular product may be rated for rain (i.e., is waterproof), or cold weather (i.e., has long sleeves and/or other warmth retention features). In another variant, the weather data which is taken into consideration may comprise "look ahead" data. That is, the weather may be reviewed for future periods (e.g., one month ahead) so as to take into account the remaining time from order submission and delivery of the product to the customer. For each available product, a separate score may be derived relating to each of temperature and precipitation.

At step 340, data relating to consumer's specific preferences is compared to the product data to determine a likelihood that the consumer will prefer a style, fit, etc. of each product. To accomplish this comparison, the recommendation engine 104 obtains (i) product data records from the product database 156 and/or the user and product profile databases 116, and (ii) subscriber data records (e.g., profile records) from the customer database 158, the user and product profile databases 116 and/or the user data servers 102. The data is compared in order to determine a percent match for a given item to a specific subscriber profile.

In one specific embodiment, a first set of aspects are set as primary filters; such filters include gender and size (e.g., shoe size, top size, bottom size, etc.). As discussed elsewhere herein, these aspects are relatively static in nature and therefore, products which are not intended for a particular user's size or gender will not be provided to the curator as recommended products. Hence, the products/items which do not meet the first set of aspects relating to the particular subscriber are no longer evaluated (i.e., are filtered out) for subsequent comparison and recommendation purposes.

A second set of aspects are utilized to derive a score, such aspects are more dynamic in nature and products may be ranked according to their applicability to the given aspect. For example, sports/activities in which the customer participates, style and color preferences, etc. may be utilized in a comparison to the product data. Products which closely match the user's profile preferences will be scored more highly.

At step 342, the product seasonality is rated for applicability to the current season (or the season during which the product will be delivered to the subscriber). In one embodiment, the applicability is determined by examining the product profile data against a calendar date on which delivery is scheduled and a predetermined range for each sport category. In other words, the recommendation engine 104 determines whether the sports season to which the product is related is within a predetermined range of the scheduled delivery date. For example, if a product is particular to basketball, and the delivery date of the product is not expected to be within an acceptable range of dates or months in which basketball-related products are normally purchased, the product is given a low sport seasonality rating. The system may further incorporate specific dates of interest relating to one or more sports (e.g., Olympics, World Series, NBA Finals, Super-Bowl, All-Star games, etc.). These specific dates and date ranges may be cross-referenced in one embodiment to sports teams which are near a particular subscriber geographically in order to determine not only that the NBA Championship game is occurring soon, but also the local team is participating in the big game. Additionally, the user's specific preference for a given sport/activity may be taken into account (e.g., an interest in basketball generally, an interest in specific players or teams, activity data logged for a given sport, etc.).

Each of the aforementioned comparison basis (e.g., popularity, weather appropriateness, style match, and sport seasonality) or score modules are, in one embodiment, used as the basis for determining an overall score for the product as it relates to the particular subscriber and/or a group of subscribers. The overall score is provided to the curator at e.g., the curator interface 250. In addition, the aforementioned score modules (e.g., popularity, weather appropriateness, style match, and sport seasonality) may be individually provided for viewing by the curator such as in a drop down menu 252 on the curator interface 250. In this manner, the curator may see a visual representation of why a product is/is not highly recommended in order to assist in selecting certain ones thereof for inclusion in the subscriber's next delivery. As will be discussed in greater detail below, each score module is weighted according to its ability to precisely identify appropriate products.

Optionally, per step 344 of the recommendation flow 330, the recommendation engine 104 makes one or more adjustments to its product recommendations on the basis of feedback information received from the feedback service 154. The feedback information utilized may include information which originated at the curator apparatus 106 and which relates to items which the curator selected/did not select for delivery to the subscriber. In addition or alternatively, the feedback information utilized may include information which originated at the user device 110 and/or the product warehouse 112 and which relates to items which the subscriber returned/did not return from the curated box of recommended items. The feedback information may be utilized to derive patterns which assist in future recommendations. For example, the recommendation engine 104 may determine one or more items which work together (i.e., which when sent together are more likely to be purchased); additionally, the recommendation engine 104 may identify common attributes of returned items and common attributes of stylist selections on a per subscriber basis.

In one embodiment, the feedback information is used by the recommendation engine 104 to adjust at least one of the user profile, one or more product records, a comparison algorithm, and/or a threshold value as discussed elsewhere herein. In another embodiment, the feedback information may be used to adjust a scores of one or more of the above-referenced score-modules.

As noted above, the overall score for a given product is calculated by the recommendation engine 104 at step 346. Specifically, the recommendation engine 104 weighs the result of each of the aforementioned score modules (steps 336-342) according to the ability of each to predict a fitness of the product to the subscriber's profile and/or a likelihood of purchase of the product by the subscriber. The aforementioned feedback information may be weighted prior to being applied to individual ones of the scores (as noted above), or may be taken into account prior to the weighting at step 346. In another alternative, the feedback information may be taken into consideration after the weighting occurs at step 346. In one embodiment, the weighting factor for each score module is manually entered by an operator at the recommendation engine 104. Over time, the recommendation engine 104 may "learn" optimum weighting factors on a per subscriber, per curator and/or per item basis, such that these may be adjusted automatically and without substantial operator intervention. This may be accomplished via manual entry followed by automatic adjustments based on e.g., the aforementioned feedback information. In another variant, regression techniques (e.g., logistic regression) may be applied to optimize the weights based on whether or not products are kept by consumers/subscribers.

The weighted scores are then added together in one embodiment to generate a total score per product. The products are then organized according to their total score and displayed to the curator as recommendations. In one embodiment, only those products having a score which meets a predetermined threshold will be displayed to the curator. Alternatively, all products will be displayed in order by score irrespective of the score thereof. In either embodiment, the products which were filtered out will not be displayed to the curator irrespective of score or display type.

In one particular example, the operator at the recommendation engine 104 may set the score modules to be weighted as follows: profile score module (e.g., subscriber's dynamic aspects) is weighted at 4×, the temperature score module is weighted at 3×, the sports seasonality score module is weighted at 2×, the popularity score module is weighted at 2×, and the precipitation score module is weighted at 1×. In another variant, a further distinction may be made within the category of sport seasonality so as to account for a product which fits more than one sport group. For example, each item may be given primary and secondary sport associations which are weighted differently. The primary sport association comprises the main sport to which the product is associated and may be weighted higher than secondary sport associations. In one variant secondary sport associations comprise a list of additional sports to which the product may be associated; these may be weighted less than the primary sport associations and may be representative of an average of all of the secondary sports to which the product is associated. As used herein, the term "sport" may refer to any activity including but not limited to individual sports, team sports, athleisure, etc.

As discussed elsewhere herein, the specific amount by which each score module is weighted may be dynamically modulated or adjusted based on feedback from e.g., the stylist and/or the customer. For example, it may be determined that items recommended by the recommendation engine are infrequently selected by the curator and/or infrequently kept by the user in favor of products which have a strongly alternate profile than the computer recommended items. In one specific example, suppose a recommendation engine determines that items which are appropriate for a warmer climate should be provided to a set of users. However, it is determined that those users frequently return the items and instead elect to keep colder weather gear. It may then be concluded that the weighting of the weather score module is too high and should be adjusted.

In another embodiment, the foregoing weighting may be adjusted per-subscriber and/or per-demographic. In this manner, as a subscriber make selections to keep or return items, this information is utilized to adjust what score modules are more important to that subscriber. The system may start each subscriber or subscribers within a given demographic with a particular set of weights applied to score modules, which are then adjusted over time as the subscribers provide feedback. Similar logic applies to a demographic groupings such that adjustments are made to a wider population of subscribers within a demographic.

After the weights are applied and scores are determined for recommendations (step 346), the recommended products are presented on a curator interface 200 and 250 and the curator is, per step 348 provided a means to select one or more of the recommended products for delivery to the subscriber. The curator selection of particular products, as noted above, may be based on the recommendation engine 104 generated scores. In addition, the curator may take into account his/her own observations and motivations when selecting items for delivery.

As also noted elsewhere herein, the curator may be required to meet certain requirements or rules when finalizing a curated box for delivery. For example, a certain minimum and/or maximum numbers of items must be selected, a number of each type of item may be required, a maximum of each type of item may be provided, a minimum and/or maximum total price may also be required to be met, and/or the system may also identify products which are set to be discounted within a set time period and set a rule that these products should not be shipped after the time period. For example, if an item will be discounted on May 1st, the rule will disallow it to be added to a shipment which is set to be delivered less than 45 days before May 1st.

Once the curator has selected appropriate numbers and types of items, an order for the items is provided to the product warehouse 112 and the fulfillment flow step 350 is entered. Additionally, an optional feedback flow is entered at step 368 which relates to the curator's selections (at step 348). Each of these flows (350 and 368) will be discussed in further detail below.

Referring now to FIG. 3D, a logical flow diagram illustrating a generalized method 350 for fulfilling a curator-selected order of computer-recommended products is given. As shown, per step 352 an order is generated. The order comprises a computerized listing of those items which were selected by the curator at the curator interface 200 and 250. In addition, the order lists the customer contact information necessary for delivery of the items thereto (e.g., name and address); a customer identifier and/or payment method may also be listed to ease the processing of returns (as discussed below). Customer information, including name, address, identifier, and/or payment method may be accessed by the curator via the customer validation service and/or payment authentication service provided via recommendation services 152 and/or information obtained from the customer database 158, user and product profile database 116, and/or the user data servers 102. The order is provided from the curator apparatus 106 to the product warehouse 112 at step 354.

When the order is received at the product warehouse 112, it is processed for packaging and shipping to the subscriber (step 356). In addition, shipping materials and a return form which includes the customer identifier may also be shipped in order to ease the return process (as discussed below).

The customer/subscriber is given a predetermined amount of time in which returns of the items in the delivery may be processed. Hence, per step 358, the process 350 proceeds to wait for the predetermined period. At step 360, it is determined whether any of the products were returned within the return window. Items which are not returned within the return window (either because they were purposely kept or because the time window expired) are per step 362 processed for payment. In one embodiment, the payment is processed via the product warehouse accessing a payment method which was provided by the curator in the order (see discussion of step 352 above), or pulled from e.g., the customer profile. Items which are returned within the return window are, per step 364, processed using e.g., traditional return mechanisms. That is, the item is inspected, repackaged, and placed back into inventory or circulation, and the customer is not charged for the item.

Finally, at step 368, the feedback flow is entered which relates to the subscriber's elections to keep or return items.

Figure 3E:
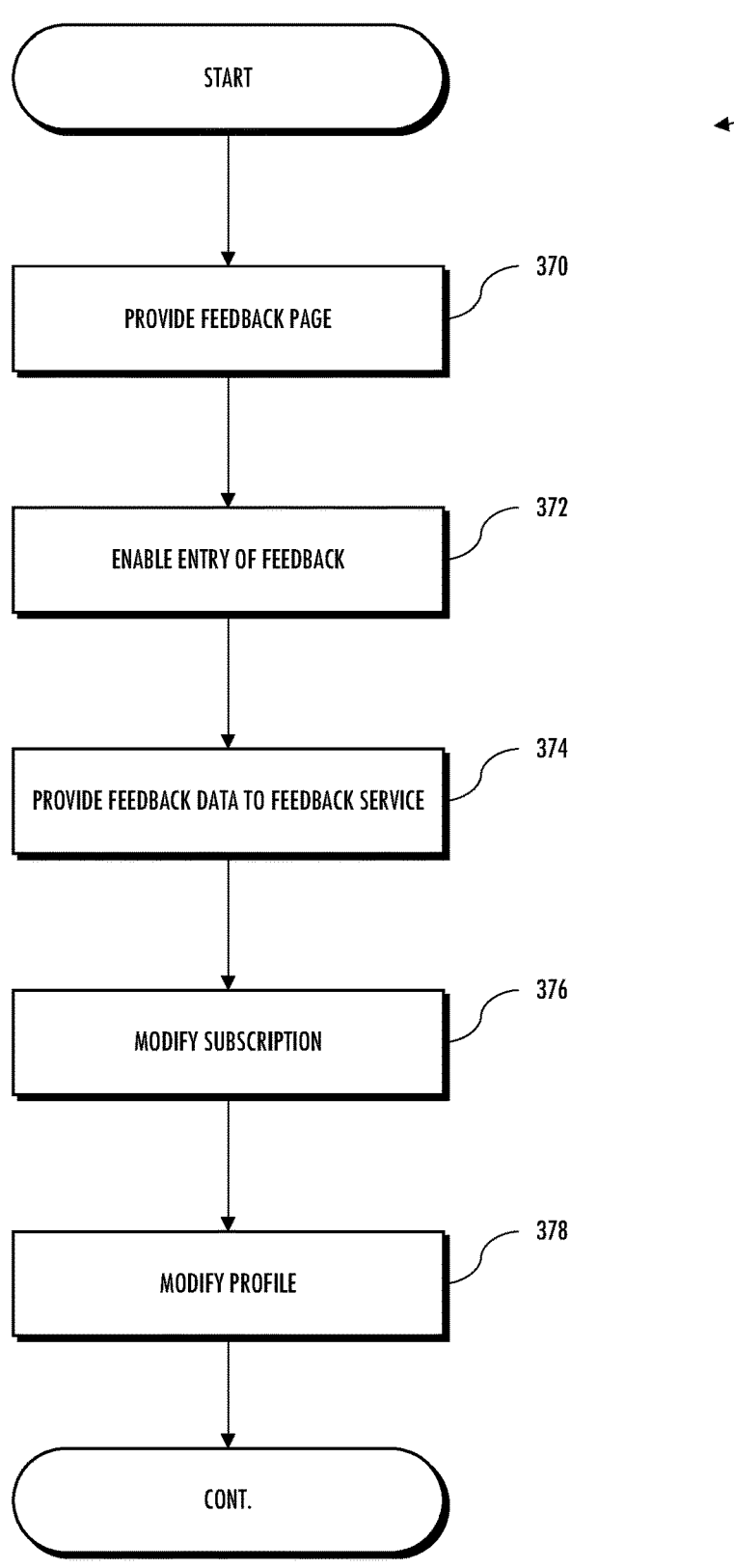
FIG. 3E is a logical flow diagram illustrating a generalized method of enabling feedback regarding curator selected ones of computer-recommended products in accordance with one embodiment of the present disclosure.

The feedback flow 368 is illustrated at FIG. 3E. As shown, per step 370, a feedback page is provided to the curator and/or subscriber to enable entry of feedback step 372. In one embodiment, the feedback page may take the form of a web-based interface into which the curator and/or subscriber may enter information. Alternatively the feedback page may comprise a physical paper on which the curator and/or subscriber enters comments, such as e.g., paperwork provided with a shipment to the subscriber. In either instance, the curator and/or subscriber is able to enter feedback into the page (such as by typing, selecting options, and/or writing). In the instance the feedback page comprises a web page, the page may be pre-loaded with the items which were delivered to the subscriber and the entry of feedback may comprise enabling the subscriber to comment regarding the fit, style, etc., of each item and/or to select one or more designators relating to satisfaction (e.g., four out of five stars, 8 out of 10, etc.). The feedback may request a level of detail which best enables the curator and/or the recommendation engine 104 to make use of the information. It is appreciated that similar webpages may be provided to the curator to enable the curator to provide information regarding a selection or dismissal of certain items which were recommended by the recommendation engine 104. In the instance the feedback page comprises a physical paper, the paper may list each item which was delivered to the subscriber, and the subscriber hand writes comments and/or marks indicators for each item provided thereto (e.g., fit was too small, too large, just right, etc.). The subscriber may further be required to hand write the item names or descriptions in another embodiment. Predetermined alpha-numeric codes may be provided to enable consistent processing.

Data relating to the entered feedback is provided to the feedback service 154 at step 374. In one embodiment, the raw data entered by the curator and/or subscriber is processed into a format which the feedback service 154 is able to read. For example, text and hand written responses may be formatted using a word search feature to arrive at a general response category into which the comment may be placed.

The feedback service 154 uses the feedback data to modify the customer's subscription (step 376) and/or the customer's profile (step 378) where appropriate. Specifically, when the feedback indicates that the customer is unable to purchase items because he/she doesn't have enough budgeted for the expense, the customer's subscription may be modified to decrease the number of curated boxes the customer will receive and/or adjust the rules relating to minimum and/or maximum costs. In another example, the customer may consistently report a size small top as being too small. In this case, after a predetermined number of returns for this reason, the customer's profile may reflect that he/she is in fact a medium and not a small.

It is further appreciated that certain feedback may be utilized by the feedback service 154 to immediately effect the next recommendation and/or to cause a mini-delivery to be shipped to the customer. Specifically, when feedback data is returned that the customer gave a product highest ratings in style, color, etc., but that the size provided was too small or too large, the feedback service 154 may indicate to the curator device 106 that he/she may want to follow up with the customer to determine whether the customer would prefer to receive the item again but at a new size. Alternatively, an order for the changed size may be generated by the feedback service automatically, and optionally sent to the curator for approval, or provided automatically to the product warehouse 112 for fulfillment.

Additionally, the threshold values, weighting variables, and/or algorithms used to determine product recommendations by the recommendation engine 104 may be adjusted based on the feedback data (not shown).

Figure 3F:
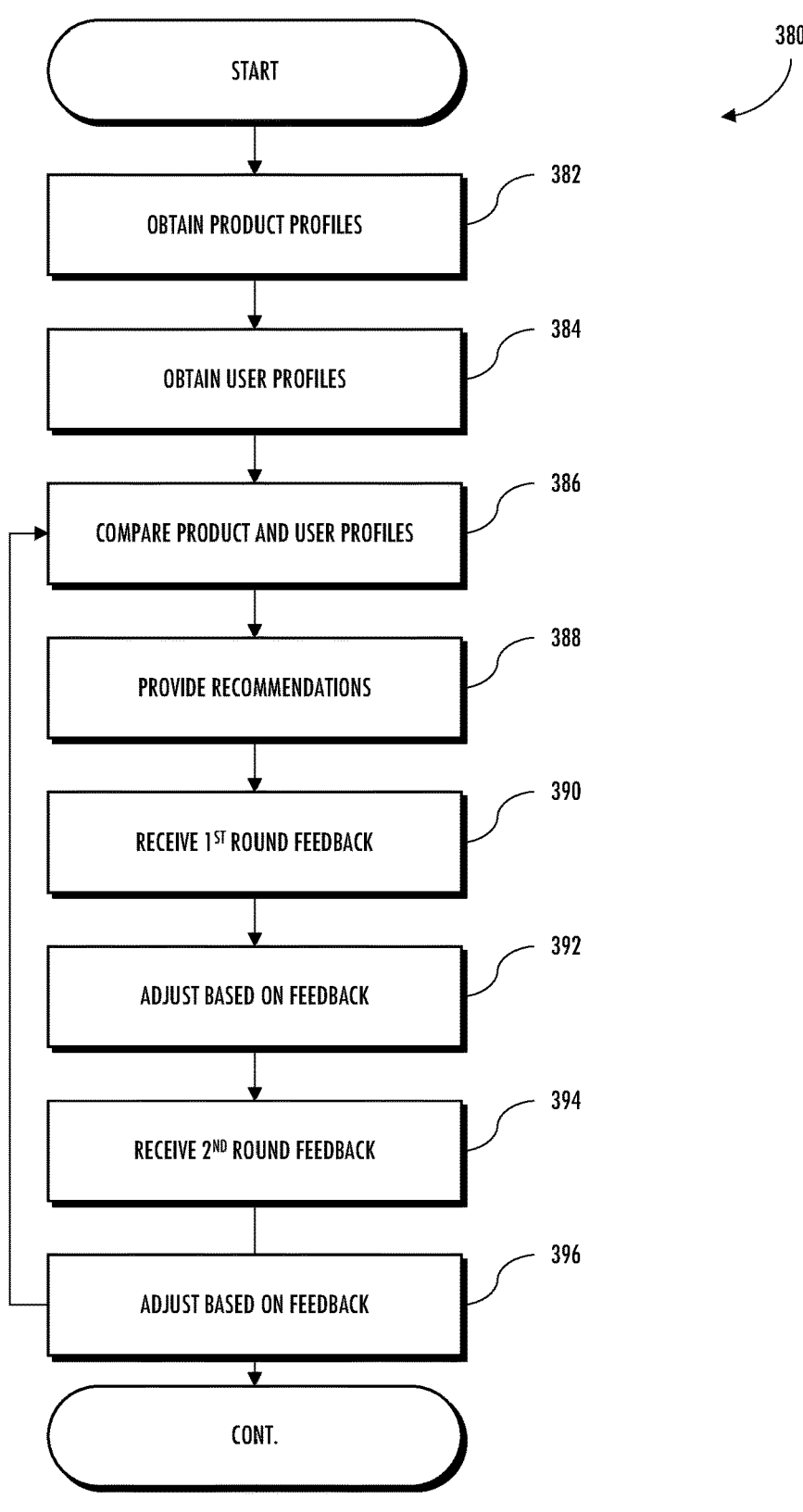
FIG. 3F is a logical flow diagram illustrating a generalized method for providing enhanced product recommendations in accordance with one embodiment of the present disclosure.

Referring now to FIG. 3F, a generalized method 380 for providing enhanced product recommendations in accordance with one embodiment of the present disclosure is provided. As shown, per steps 382 and 384, product profiles and user profiles are obtained from e.g., the user and product profile database 116. As noted elsewhere herein, the product and user profiles may comprise vectors, matrixes, or tables. The user profiles may be generated from information obtained about the user from e.g., a user data server 102, and the product profiles may be pulled directly from one or more inventory catalogs. Moreover, a separate customer database 158 and product database 156 may be provided for storage of the user and product profiles, respectively, in another embodiment.

Next, per step 386, the product profiles and user profiles are compared to arrive at one or more product recommendations (step 388), i.e., products which have a threshold level of similarity to the user profile, which are provided to a curator apparatus. As discussed elsewhere herein, the comparison of the product and user profiles may be performed via utilization of a filtering algorithm and the remaining products evaluated within the context of one or more scoring modules. The resultant scores are then weighted and totaled across each of the scoring modules to arrive at an overall score, which is used by the recommendation engine 104 to identify one or more products to be provided as selectable options to the curator (step 388).

The curator (a human operator at the curator apparatus 106) selects certain ones of the recommended items and based on the selection, a first round of feedback is received at the recommendation engine 104 (step 390). This curator-selection based feedback is used to adjust the recommendation at step 392.

Meanwhile, the curator-selected ones of the recommended products are provided to the subscriber. The customer may elect to purchase from among the provided items. The ones of the provided items which the consumer does not elect to purchase are returned. Information regarding the returned items and/or items kept for purchase by the consumer is provided as second round feedback to the recommendation engine 104 and/or curator 106 at step 394. This subscriber-selection based feedback is also used to adjust the recommendation at step 396. Specifically, both the recommendation engine 106 and/or the curator 106 him/herself may use the second round feedback to make adjustments.

The process 380 repeats at step 386 where product profiles are again compared to the user profile after a predetermined period of time. For example, the foregoing method 380 may be utilized in a subscription service, such as where the user/consumer receives selected items periodically, e.g., monthly, every 8 weeks, etc.

Exemplary Workflow

Figure 4:
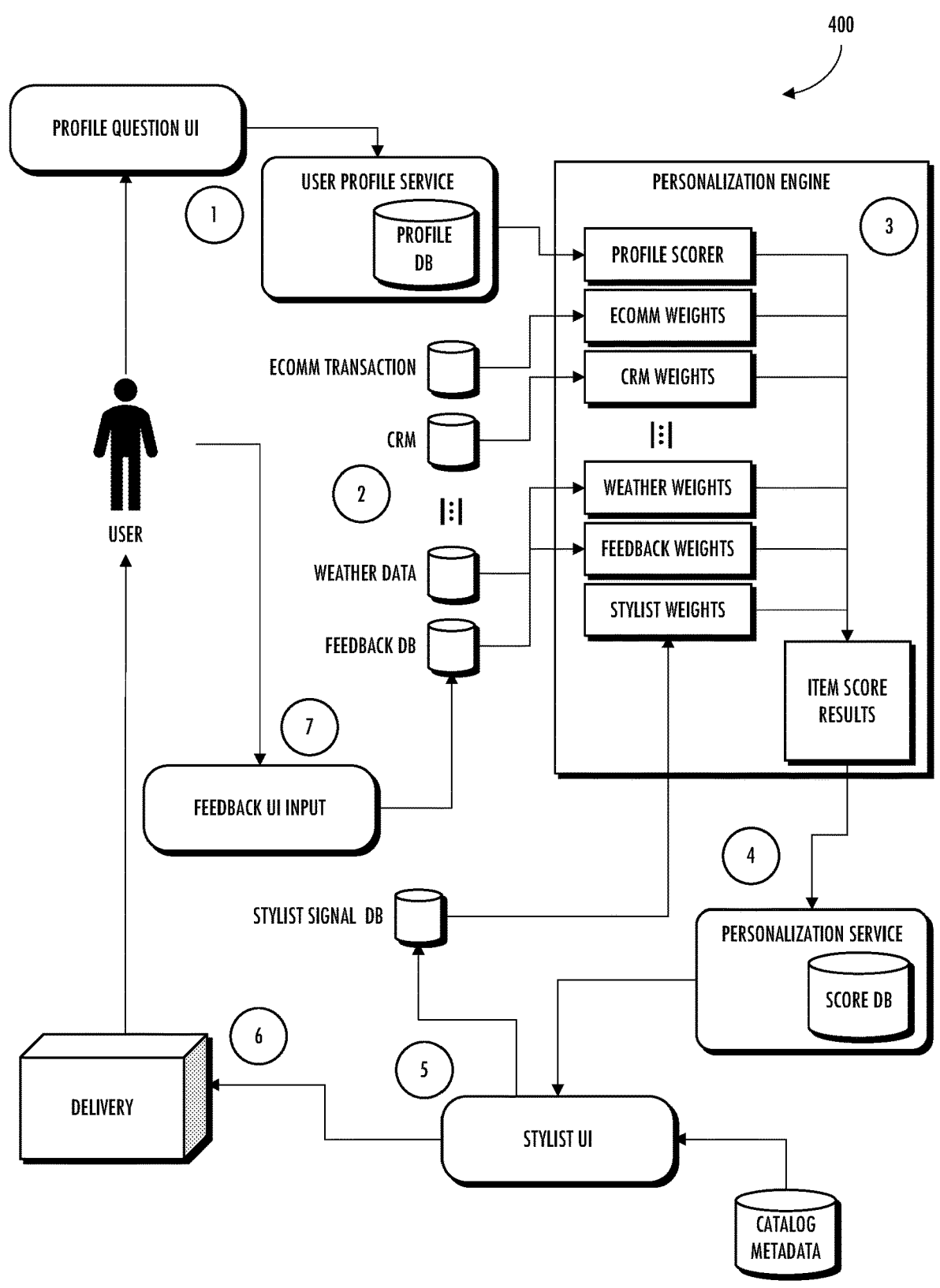
FIG. 4 is a block diagram illustrating a generalized workflow for providing enhanced product recommendations in accordance with another embodiment of the present disclosure.

FIG. 4 illustrates generalized workflow for providing enhanced product recommendations in accordance with the methods and systems outlined above. It is appreciated that the herein described workflow may be utilized in connection with any of the above-referenced embodiments.

As illustrated in FIG. 4, at item 1 of the exemplary workflow 400, a profile question interface is provided to customers. The profile question interface comprises a graphic user interface (GUI) which displays an interactive questionnaire to the customer. In one variant, various ones of the questions are preloaded with answers derived from customer data, such as data collected and stored at the user data servers 102. Verified answers to the customer questions and/or answers entered by the customer manually are stored at the profile database of FIG. 4.

As demonstrated by item 2 of the workflow 400, a plurality of data sources provide data to a personalization/recommendation engine. In the illustrated example, an ecommerce transaction database, a customer relationship management (CRM) database, a weather database, a feedback database, and a stylist database are provided. However, it is appreciated that any number and type of databases may additionally be included; the foregoing are merely exemplary of the general concepts of the present disclosure. Data from each of the foregoing databases as well as the profile database generated at item 1 above is provided to the personalization engine which, at item 3, weighs each of the data provided thereby and generates a per-item score.

Specifically, the personalization/recommendation engine takes into account profile data from the profile database; sales or item popularity data from the ecommerce transaction database; demographic data from the customer relationship management (CRM) database; temperature and precipitation data from the weather database; user-selection feedback data from the feedback database; and stylist-selection feedback data from the stylist database. Additional data may be provided from a database for e.g., indicating sports seasonality, time since last purchase of each item type by a user, etc.

The item scores are stored at a score database of a personalization service at item 4 of the workflow 400 of FIG. 4. A stylist interface is provided at item 5 of the workflow 400. According to item 5, the score information and catalog metadata are utilized to create a stylist interface which provides relevant information about the personalization engine-recommended products. In one embodiment, the interface is of the type discussed above with respect to FIGS. 2A-2B. Scoring information is provided to the curator to assist in selection of one or more products for delivery to the subscriber; metadata is used to display images of the products and to provide sizing recommendations (i.e., runs small, loose fit, etc.).

Information regarding the stylist selections is provided to a stylist feedback database, which as noted above is taken into account when future recommendations are made by the personalization engine.

Next, per item 6, the items which the stylist has selected are delivered to the subscriber. The subscriber keeps and pays for items from the shipment which he/she elects to keep, and returns the items he/she is not interested in keeping/purchasing. Information relating to the items which the subscriber keeps and/or returns is provided at item 7 to a feedback database. As noted above, the customer feedback is taken into account when future recommendations are made by the personalization engine as well.

Alternate Recommendations and Learning

The following discussion relates to one particular implementation of the broader concepts provided herein. This discussion is not limiting and represents one embodiment which may be utilized (or not utilized) in connection with the methods and systems discussed elsewhere herein.

As noted elsewhere herein, in one embodiment the aforementioned health parameter data and other data obtained from one or more health-monitoring applications may be utilized to generate one or more consumer profiles relating to each consumer. A subscriber or customer profile is created for each customer and stored at the user and product profile database 116 and/or the customer database 158. In one variant, the user profiles each comprises a table, matrix, or vector. Data stored in the profile is verified by the user via an on-boarding process as discussed above. In another alternative, or in addition, data for the user profile is provided directly by the user via one or more on-boarding questions.

It is appreciated that certain ones of the aspects relating to a user comprise relatively fixed or static aspects, and certain other ones of the aspects relating to a user comprise relatively dynamic or changing aspects. In order to track and/or represent these disparate data types, in one variant, each user is associated to at least two user profiles one for each of the static and dynamic data.

The static aspects may include e.g., gender and/or gender identity which may be represented in the consumer profile as M or F. Other fixed aspects include e.g., pants size, shirt size, shoe size, etc. These fixed value aspects may be represented in the profile as their actual value (e.g., S, M, L, XL, size 11.5, etc.). The fixed value aspects are, in one embodiment, utilized in a comparison to filter in/out available products based on whether each product is applicable/inapplicable to the particular consumer. That is to say, when the static user profile is compared to product records, products will be filtered in/out for a given user based on e.g., whether they are intended for men or women, the available sizes, etc.

The static aspect profiles for each user which are generated via e.g., cooperation among the recommendation engine 104, curator apparatus 106, user data server 102, user and product profile database 116, customer database 158, and/or or other network 100 entity. In one variant, the static user profile information (e.g., shirt size, pant size, shoe size, gender, etc.) is derived from information obtained by the profile generating apparatus from data obtained about the user from the user data server 102, user device no, and/or customer database 158. For example, as noted above, the user may enter information into a profile for one or more health-monitoring applications running at the user device

110. That information is stored at a user data server 102 and may then be obtained by a profile generating apparatus in order to appropriately populate the static profile for that user. In one specific example, the user may enter a gender when establishing an account with a health-monitoring application which is then used to populate the gender field in that user's static profile. In another specific example, the user may enter an age, height and weight when establishing an account within a health-monitoring application. The profile generating apparatus, may then use this information to derive the user's size. In another embodiment, the foregoing static user profile information is obtained from direct user input in a user onboarding process, as discussed elsewhere herein.

It is noted that, although not frequently, static user profiles may be updated to reflect changes in the user's size, etc. In one embodiment, these changes are performed manually by a human operator for example at the recommendation engine 104 or at the curator apparatus 106, either in response to a consumer request to do so, or based on information received relating to returned products (i.e., products are returned a predetermined number of times with a report of being too large, too small, etc.). In another embodiment, the consumer him/herself may be provided an interface 162 within which the user's various sizes and other static profile aspects may be changed (such as via the b2c backend 164 and subscription management service of the recommendation services backend 152). In another embodiment, a process running at the recommendation engine 104 and/or the curator apparatus 106 may be configured to identify based on the aforementioned feedback information that a user's size is incorrectly listed. For example, the process may recognize that the consumer/user consistently returns shirts which are size large as being too big. After a certain number of such returns, the process will cause the user's shirt size to be decreased to medium automatically (without further curator, customer, or operator intervention).

In one embodiment, a static aspect filtering is performed prior to a comparison of product records to the dynamic user profile aspects. In this manner, e.g., products which are not available in the user's size and/or which are intended for a different gender than that which the user is or identifies with are not provided into the second comparison step (which will judge the level of interest the user may have in the product based on activities/sports, interests, recent purchases, etc.).

The static aspects may be held in a profile having any format which facilitates filtering as discussed above. In one embodiment, the static aspects are held in an n×2 matrix, where n is a number of static aspects relating to a single consumer. Each matrix is also provided with a unique user identifier. An exemplary static user profile matrix, Muser static may comprise a first column describing each aspect: shirt size, pant size, shoe size, gender. It is appreciated that other static aspects may also be represented in the static user profile matrix, the foregoing being merely exemplary of the concepts of the present disclosure. The exemplary user may for example be represented as size L or large in both shirts and pants and having a shoe size of 8. In addition, the exemplary user may be female (gender listed as F) for purposes of this example.

The dynamic or changing aspects represented in the user profiles comprise interest-level dependent indicator values; i.e., values which are dynamically adjusted in accordance with a user's interest level in a given aspect. The dynamic user profile aspects may include any number of sports or activity related interests as well as fashion preference related aspects. Some examples include e.g., running, basketball, yoga, leisure, red, black, green, patterns, shorts, tights, etc. In one embodiment, each aspect is represented by a weighted value; the weighted value increases or decreases over time in accordance with the user's interest or the applicability of the value to the particular user. For example, a user's profile may illustrate a high interest in running by designating the running aspect of his user profile as a value of 100, and a low interest in basketball by designating the basketball aspect of his user profile as a value of 0.

The dynamic aspects may, in one embodiment, also be held in as m×2 matrixes, where m is a number of dynamic aspects relating to a single consumer. An exemplary dynamic user profile matrix, $M_{user\ dynamic}$ may comprise a first column describing each aspect: running, yoga, leisure, and basketball. It is appreciated that other dynamic aspects may also be represented in the dynamic user profile matrix, the foregoing being merely exemplary of the concepts of the present disclosure. Continuing the example, the particular user may have an interest level of 100 in running, 35 in yoga, 115 in leisure (such as so called "athleisure" wear), and no interest (0) in basketball.

The user identifier and/or other user-specific information within or associated to the consumer profiles may be anonymized using a cryptographic hash function. Alternatively, other means of ensuring consumer/user data privacy may be implemented. Additionally, it is noted that in another alternative, the static and/or dynamic user profile matrixes may be represented as n×1 or m×1 vectors listing only values for the represented aspects. In this embodiment, a reference vector may be utilized to orient an operator (such as the human curator discussed herein) with regard to the aspects represented.

In one variant, the dynamic user profiles are created based on information obtained from the user data server(s) 102. It is appreciated that according to this variant, when a user establishes an account with the recommendation engine 104, the recommendation engine 104 pulls data from the user data server 102 within a designated time period (e.g., the most recent week, month, six months, etc.). From this data, the recommendation engine 104 is able to pre-populate a dynamic profile. For example, suppose a user has logged five one-hour running workouts in the last seven days. In this case, the recommendation engine 104 will set the user's interest in running as relatively high. In contrast, assuming the same user logged only one half-hour yoga workout in the last month, the recommendation engine 104 will set the user's interest in yoga as relatively low. Still further, assuming that the user has logged zero basketball workouts in the last year, does not follow any basketball players on social media, and has otherwise expressed no interest in basketball, the recommendation engine 104 will score basketball as a zero in the dynamic user profile.

It is further noted that, in another variant, the original values for the dynamic profile aspects may be manually entered by e.g., the user/consumer, an operator at the recommendation engine 104, and/or an operator at the curator apparatus 106. In addition, or alternatively, the dynamic aspect profile may begin according to a template based on one or more user-entered interests and/or other known user characteristics, e.g., gender. According to this model, these template values are adjusted over time as additional information is obtained from the user data server(s) 102 (as discussed below).

Under any of the foregoing methods for developing the dynamic user profile, it is appreciated that the dynamic profiles once created are updated according to user activity. Profiles are updated periodically, in that data is pulled from the server 102 daily, weekly, monthly, etc.; alternatively, data may be provided as it is received/obtained/sensed.

In one embodiment, as user profile data is received at the recommendation engine 104, the current dynamic aspect values are multiplied by a weighting factor to arrive at an updated weighted value. For example, if data is received indicating that the user has logged that he/she played basketball for a half hour in a health-monitoring application, the profile value of 0 for interest in basketball will be increased. The amount of increase may be proportional to the correlation of the event (e.g., playing basketball for a half hour) to the aspect (e.g., basketball), as discussed in further detail below. The weighting values utilized here are, in one variant, manually entered by an operator or curator. As noted above with regard to the score module weighting factors, in another embodiment, the recommendation engine 104 may "learn" an appropriate weighting factor over time (as is also discussed below). It is appreciated that the events and weighting factors listed in the table below are intended for example purposes only and should not be considered inclusive of all relevant events and/or possible weighting factors.

In one specific example, when the subscriber logs a workout less than 30 minutes, the weighting factor may be +5, whereas if the workout is greater than or equal to 30 minutes, the weighting factor may be +15. Social media comments that contain positive reactions to particular activities (e.g., sports, workouts, etc.) may be weighted by +2, whereas negative social media comments are weighted by −2. In addition, the system may apply a weighting factor of −25 when a product is returned. In order to account for the length of time between purchases, in one embodiment, a weighting factor of +1 may be applied for calculations occurring less than one month since the last purchase (of a particular type of product or purchases generally); and a weighting factor of +32 may be applied for calculations occurring more than one month since the last purchase.

As noted, the collected/sensed data may be used to populate and/or update the dynamic user profile as appropriate. For example, a user's continued tracked running workouts in one of the aforementioned health-monitoring applications would be used to increase a weighted value indicative of an interest in running related products (e.g., running shoes, running clothing, etc.). Moreover, the sensed or collected data may be tracked over time such that a user's interest in an item increases from the date of a new purchase of the item. For example, running shoes have a limited lifespan; hence, the model discussed here would take into account a date of last purchase of running shoes and an average number of miles run per day to increase the user's interest in a new pair of running shoes. The date of last purchase, in one embodiment, is determined from the date on which a purchase order was made by the user, such as a purchase order made in connection with the herein described subscription service. In other words, the date on which running shoes were purchased would be known as the date a curator selected and caused running shoes to be delivered to the consumer. In another embodiment, the user may provide the date of purchase of the running shoes. Still further, such data may be ascertained when the user makes a purchase from a connected application (e.g., a shopping application which configured to share information with one or more of the aforementioned health-monitoring applications) or using a connected credit card/debit card. Similar logic applies to other products such as e.g., tights/leggings, shirts, shorts, sweatshirts, accessories, etc.

In another example, social media posts may be used to populate and/or update the dynamic user profile. For example, a user's "likes" and follows on a social media platform (such as one associated with one of the aforementioned health-monitoring applications) regarding a particular basketball player would be used to increase a weighted value indicative of an interest in basketball related products (e.g., basketball shoes, basketball clothing, the identified player's jersey, etc.). Similarly, the content of the user's posts may be analyzed for applicability to certain sports, celebrities, products, etc. For example, a user may write a post which states "I tried my first hot yoga session today, I loved it!" A processor running at e.g., the recommendation engine 104 analyzes the post to determine that mention of an interest in yoga correlates to an increase in the weighted value indicative of an interest in yoga; in addition, the overall positive response (" . . . I loved it!") may be taken into consideration. In another example, the user may simply "check-in" to a yoga center and the recommendation engine 104 may utilize this information to increase the weighted value indicative of an interest in yoga.

In addition, other details regarding the user collected at account registration (i.e., when the user registers with one or more health-related applications or devices) may be utilized to populate the user profile table, matrix, or vector. For example, when the user establishes an account with a health-monitoring application the user may be required to enter basic information such as gender, height and weight (from which sizes may be derived), and interest in particular athletic activities, celebrities, etc. This information may be pulled from the user data server 102 during creation of both the static and dynamic user profiles.

As noted above, the user profiles are stored at e.g., the user and product profile database 116 and/or customer database 158. In addition, as also noted above, the product profile database 116 and/or the product database 156 is configured to store a plurality of product profiles. In one variant, each product profile comprises a table or p×2 matrix, where p is a number of aspects relating to an available product. In one specific embodiment, the number, p, of aspects of each product profile corresponds to the number m of aspects of the dynamic user profile. As noted above, the product records are first filtered according to the static user profile. Accordingly, a means of identifying sizes and gender targeting of each product are given. In one embodiment, this is satisfied by creating a product record identifier or tag (such as e.g., size S, M, L, etc.) on each product record. The recommendation engine 104 may easily filter the product records prior to comparison according to the dynamic aspects.

Alternatively, the number, p, of aspects of the product profiles corresponds to the combined number, n+m, of aspects of each of the static and dynamic user profiles. According to this embodiment, the recommendation engine 104 knows that the first n number of aspects in the profile comprise fixed value aspects and are to be compared to the user's fixed profile and that the remaining aspects (p–n) correspond to the dynamic aspects and are to be compared to the user's dynamic profile. Similar logic applies in the instance the user profile includes combined static and dynamic aspects. In this manner a simple comparison between the product profiles and an individual consumer profile is facilitated. In one variant, this may be accomplished using a dot product between the two vectors (a user profile vector and an individual one of the product record vectors). A scalar quantity may be found (via the aforementioned dot product calculation) for each product profile as compared to a particular user's dynamic profile. Then, only those products which meet or exceed a predetermined threshold are recommended.

Static user profile updates, as discussed above, may be made manually or via machine learning. Dynamic user profile updates utilize a weighting table (such as that discussed above). Suppose for example, that a user having the dynamic profile from the example above ($M_{user\ dynamic}$) logs a one hour run with his/her health-monitoring application. To account for this event, an event record is created as a matrix or a vector. Next, the event record is multiplied by the weighting factor. According to the example above, the activity (a workout of more than 30 minutes) is weighted by +15. Hence, the event record is weighted multiplied by positive 15. In order to update the user's profile, the newly created weighted event record or vector is added to the user's dynamic profile vector thereby increasing the score for running from 100 to 115. The updated user dynamic profiles may then be used to determine relevant products as discussed below.

As noted elsewhere herein, the recommendation engine 104 generates recommendations (i.e., selects one or more of a plurality of products targeted to a specific consumer) by comparing each of the product records to the consumer's profile via a comparison algorithm. In the variant discussed herein, this occurs via mathematically determining a scalar quantity (via dot product) of two vectors (the product record vector and the updated user profile vector) and comparing the scalar quantity to a threshold. Those products producing a scalar quantity at or above the threshold are added to a list of recommended products for that consumer.

For example, suppose the system is to determine the relevance of Product A having a product record of {running 100, yoga 5, leisure 25, basketball 50} to the dynamically updated user profile {running 115, yoga 35, leisure 25, basketball 0}. In order to do so, the scalar quantity associated for the comparison of the profile to Product A is determined. In this case, the scalar quantity would be:

$$\begin{bmatrix} 100 \\ 5 \\ 25 \\ 50 \end{bmatrix} \cdot \begin{bmatrix} 115 \\ 35 \\ 105 \\ 0 \end{bmatrix} = (100 \times 115) + (5 \times 35) + (25 \times 105) + (50 \times 0) =$$

$$11,500 + 175 + 2,625 + 0 = 14,300$$

As noted above, the determined scalar quantity is then compared to a threshold to determine whether Product A should be recommended to the user/consumer. For example, the threshold may be 10,000; in which case Product A will be recommended to the user (because it has a scalar quantity that exceeds the threshold). The specific thresholds, however, may be pre-loaded at the recommendation engine 104 or manually entered by an operator of the recommendation engine 104 and/or curator.

As discussed above, the recommendation engine 104 is further configured to utilize at least two feedback steps to ensure that its recommendations are in line with the user's preferences. The first feedback mechanism comprises utilization of feedback received from a human curator at a selection or curator apparatus 106. When the human curator or operator makes a selection of one or more of the items in the list, information about the selection is provided back to the recommendation engine 104. Additionally, information regarding items from the list which are not selected is gathered. In one variant, the curator may additionally provide detailed descriptive information relating to his/her reasoning for selected/not selecting certain products. The second feedback mechanism comprises utilization of feedback received from the customer/subscriber. The returned items are received at the product warehouse 112, which reports back to the curator apparatus 106 and/or the recommendation engine 104 information relating to the returned products and/or the items which were not returned. In addition, the customer may additionally provide detailed descriptive information relating to his/her reasoning for selected/not selecting certain products. The feedback information is used by the recommendation engine 104 to adjust at least one of the user profile, one or more product records, the comparison algorithm, and/or the threshold value as discussed herein. The curator apparatus 106 may additionally utilize the consumer feedback information to assist the curator him/herself in making future selections (i.e., human learning).

In a first embodiment, when feedback information is received that a user did not wish to purchase Product A, the user's (updated) dynamic profile is updated once again. In this instance, a weighted product record is created by multiplying the Product A vector by a weighting factor corresponding to the return (e.g., −25 from Table 1 above), then adding the weighted product record to the most recent dynamic profile for the user to create an updated user dynamic profile.

In another embodiment, the product record itself is adjusted. According to this embodiment, the weighted product record is created as indicated above, then such product record is used going forward in future comparisons to the user's profile. In addition, other product records meeting at threshold level of similarity to that of Product A are identified and likewise updated/weighted. Various mechanisms may be used to determine similar products including, e.g., utilizing metadata or other tags to the product records to identify a product or sport line, using a dot product comparison of other product records to that of Product A, etc.

In yet another embodiment, the comparison algorithm itself may be updated in response to the first and/or second feedback. In one embodiment, this may include e.g., adding, subtracting, multiplying, dividing, or other performing any other mathematical operation to the scalar product and/or the vectors prior to applying the dot product formula.

In a further embodiment, the similarity threshold may be adjusted in response to the first and/or second feedback. That is, rather than recommending products having a scalar quantity greater than or equal to 10,000, the recommendation engine 104 may adjust the threshold to a number just above the scalar quantity that was determined for the returned product, Product A, or in this case the threshold may become 14,301 which is greater than the scalar quantity returned 14,300 when Product A was originally recommended. In the instance a plurality of products are returned, the recommendation engine 104 may use the lowest scalar quantity score of the returned products (or the highest) to adjust the threshold in the manner outlined above.

Alternate Methodology

Figure 5:
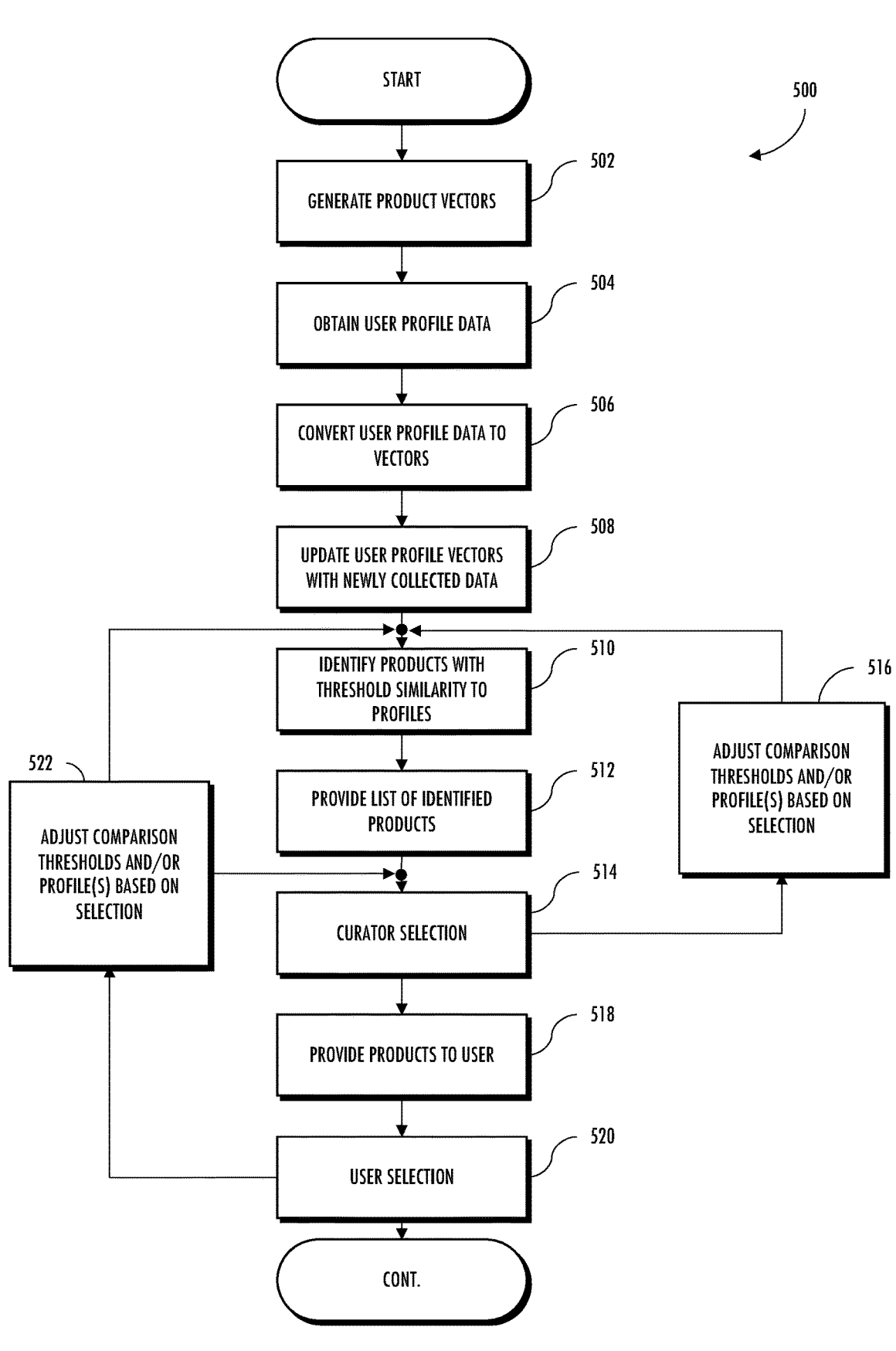
FIG. 5 is a logical flow diagram illustrating an exemplary embodiment of a method for providing enhanced product recommendations in accordance with another embodiment of the present disclosure.

FIG. 5 below describes a method 500 which utilizes the alternate embodiment discussed above in order to enable enhanced recommendations in accordance with the present disclosure.

As shown, per step 502, a plurality of product vectors are created. In one embodiment, these are created at the recommendation engine 104 or any entity in communication therewith via the network 108. A product vector is created for each product available for purchase by consumers and includes information relating to its size and gender for which it is intended (where appropriate). In addition, each product vector comprises one or more aspects which describe the character of the item. For example, a pair of running shoes would have a high score in running character, a medium score in leisure character, and a low score in yoga character.

Next, at step 504, user profile data is obtained. In one variant, the user profile data is obtained from one or more user data servers 102. Each of the one or more user data servers 102 is configured to receive activity and profile data from a plurality of health-monitoring applications in communication with or running on a user device 110. The recommendation engine 104 or other apparatus in communication therewith converts the user data to one or more user profile vector at 506. Specifically, for a given user, two user profiles may be created, one for his/her static profile and the other for his/her dynamic profile (discussed above). In one specific embodiment, the static user profiles comprise n×1 vectors, the dynamic user profiles comprise m×1 vectors, and the product profiles comprise p×1 vectors. Still further, the number, p, of aspects of the product profiles corresponds to the combined number, n+m, of aspects of each of the static and dynamic user profiles in one variant.

Per step 508, the user profile vectors are updated as new activity and/or profile data is collected. For example, a user's weight may be obtained from a smart scale application and updated to the user data server 102. The recommendation engine 104 uses the updated information to determine whether the user's shirt and/or pant size should be updated. In another example, the user may log a first ever one hour yoga session, which is reported via a health-monitoring application to the data server 102. In turn the recommendation engine 104 uses this information (pulled from the data server 102) to update the user's profile to increase an interest in yoga. Detailed discussion of one embodiment of how this may be accomplished is provided above.

Next, the most recently updated user profile(s) are compared to the product profiles to identify one or more products having a threshold level of similarity to the user's profile(s) at step 510. In one embodiment, as discussed above, products are filtered in/out based on the static user profile aspects. In this manner, the remaining products comprise only those which are applicable to the user/consumer based on e.g., size and gender. A dot product is then calculated between a product vector of each of the remaining available products and the user's dynamic profile. The scalar quantity (result of the dot product calculation) is then compared to a threshold value. Product profiles which produced a scalar quantity at or above the threshold are then, per step 512 provided as a list of recommended products.

A human operator or curator at the curator apparatus 106 is provided with the list of identified products and selects from the list individual ones of the products (step 514) to be provided to a user/consumer. Feedback information is generated from the curator's selections and, at step 516, the comparison, the threshold, the user profile(s), and/or one or more product profiles are adjusted (as discussed elsewhere herein). In response to the curator selection, a delivery order is created for the product warehouse 112 which is used to cause delivery of the products to the user/consumer (step 518).

The user receives the products selected by the curator from among the items identified by the recommendation engine 104. The user may select certain ones of the products to purchase and keep, and the remaining ones of the delivered products are returned by the user to the warehouse 112

(at step 520). Information about the user's selections is generated at e.g., the warehouse 112 and provided to the recommendation engine 104 and/or curator apparatus 106 which use the information at step 522 to adjust recommendations such as by adjusting a comparison, the threshold, the user profile(s) and/or one or more product profiles.

Additional Implementations

The foregoing methods and apparatus may be utilized as discussed above to provide product recommendations for consumers. As noted above, recommendations may be based on one or more of: weather, location, user-entered information (such as style and/or sport preferences), item popularity, and/or sports season. In one variant, the item's popularity may additionally relate to the item's momentum i.e., popularity spikes. For example, an item may a relatively high popularity at initial offering, then tapers off over time; popularity may additionally spike due to pop culture reasons (e.g., celebrity endorsement, team shirts after team wins big, etc.). It is further noted that in another embodiment, information from one or more connected applications (e.g., health-monitoring applications) may be utilized to preload the previously referenced user-entered information.

In one embodiment, one or more patterns are utilized to identify products which would be of interest to the subscriber. In one implementation, such patterns may be derived based on demographics. For example, it may be determined that women between ages 25-35 are more likely to keep or purchase items having a particular style (e.g., short, strappy, colorful, etc.). Patterns may also be derived based on geographic area or location (such as that entered during on-boarding, a mailing address, and/or the customer's current location determined via GPS, IP address, etc.). According to this implementation, it may be determined for example, that customers in a given geographic area might utilize items which other geographic areas do not use as frequently; hence these are recommended. In another implementation, patterns may be derived from the subscriber's individual style. For instance it may become apparent that the subscriber e.g., doesn't like black, prefers bold patterns, doesn't like form fitting tops, etc. This information is used to inform future product selections.

In another implementation, patterns may be derived regarding an individual's price points. That is to say, it may be determined based on the subscriber's election to keep or return certain products that e.g., the subscriber's price tolerance for a top is under $30 and for bottoms is $50; products are selected for recommendation accordingly. Still further, a pattern may be derived based on particular item combinations. In other words, it may be determined that the success rate (i.e., purchase rate) for Product A increases when it is sent to consumers at the same time as Product B; stated differently, these two items pair well or go together well. Such pattern determinations are then utilized in future shipments to other consumers.

Consumers may also be grouped by primary sport and/or by primary and secondary sport combinations. For example, a particular pair of shoes may be most often selected by consumer's who primarily run. Alternatively, or in addition, a particular pair of tights may be often purchased by runners who additionally take part in yoga workouts.

In yet another implementation, patterns may be derived based on data obtained from other connected applications. For instance, certain health-monitoring applications may record and store a user's age, which may then be used to determine a pattern among similarly aged individuals. In another instance, workouts logged in another connected application may be scrutinized for patterns. For example, the herein disclosed system may categorize runners into sprinters, short distance runners, long distance runners, marathon trainers, etc. These categories are then used to identify purchase patterns; e.g., short distance runners prefer shorts whereas long distance runners prefer tights, and so forth.

Additionally, patterns may be derived which take into account more than one of the foregoing pattern bases. For example, it may be determined that women in the ZIP code 78701 are highly likely to purchase a specific product or line or products or type of product. Hence, for women in the area the appropriate product(s) are selected.

Metrics may also be derived based specifically on a particular curator's success rates (i.e., the purchase rates of the consumers for whom the stylist curator products). For instance, it may be determined that a particular curator has a high frequency of selecting items which are purchased by the subscriber and which were not highly ranked by the recommendation engine 104. From this information, the recommendation engine 104 may learn which characteristics of a given product are contributing to the curator's selection and subscriber's decision to keep the item, then utilize the information to inform future recommendations. In another example, it may be determined that the curator's selection of items which are not highly ranked by the recommendation engine 104 often results in products not being purchased by the subscriber. In this instance, the recommendation engine 104 may send an alert to the curator of the developing pattern and/or instead require that the curator select at least one highly ranked item for delivery to the subscriber.

Another embodiment relies on social media interactions of the subscriber and/or between the curator and the subscriber and/or between subscribers to derive information useful in making recommendations. In one specific implementation, the system enables the curator to "friend" the subscriber on one or more social media sites; for example, a social media portion of any of the aforementioned health-monitoring applications (including e.g., a connected health-monitoring application).

Once the connection is established between the curator and subscriber, the curator will be able to comment on the subscriber's social media activity. For example, the curator can congratulate, motivate, encourage, etc., the subscriber's logged fitness activity and/or uploaded pictures (such as where the subscriber is wearing or using one or more of the items selected by the curator). In addition, the subscriber and curator may communicate directly regarding preferences, previously delivered items, upcoming activities, etc., such as via a hosted email or chat session. In another implementation, the curator is able to review the subscriber's health/fitness activity as entered by the subscriber into the social media site. The stylist can then derive patterns or categorize the customer's activity based on the observed heath/fitness activity, which are then used to select items to provide to the customer. In a further implementation, the curator may use the "friendship" to the subscriber to recognize when goals are met and congratulate the subscriber. The curator may additionally determine based on the subscriber's meeting a weight loss goal that the subscriber should be provided new (increased or decreased) sizes.

Another implementation enabled via the social media connection between the curator and subscriber relates to the ability of the curator to review the user's activity and make additional recommendations or observe patterns which aren't as readily observable to the recommendation engine 104. In one specific implementation, the curator may be able to provide items which are tailored to a typical time of day in which the subscriber generally works out. In this manner, although the subscriber may live in a typically warm climate, he/she may be provided warmer clothing because the stylist has observed that the subscriber primarily has workout sessions outdoors and in the early morning (which is much cooler than the average temperature in that geographic area).

In a further implementation, social media data regarding a particular subscriber is used by the recommendation engine 104 and/or curator to recommend products which are specifically geared to that subscriber's goals and/or challenges. For example, assuming it is known that a particular subscriber has signed up for a challenge to run 100 miles over a 3 month period, products may be recommended based on that goal including e.g., new running shoes.

In a further implementation, the curator is additionally connected to other social media feeds of the subscriber. Such social media feeds include e.g., Pinterest®, Facebook®, Twitter®, Instagram®, etc. From these non-health monitoring applications, the curator may glean a subscriber's unique style. In another example, the stylist may review the subscriber's likes and comments to derive patterns regarding upcoming events (e.g., going to mammoth) and learn about new sports endeavors (e.g., tried out yoga). In yet another example, the curator may determine from the lack of social media activity and/or actual statements, that the user might be injured. In any of the above instances, the stylist is able to recommend particular products based on the social media gathered information (e.g., new styles, snow gear, yoga gear, recovery products, etc.). Additionally, the recommendation engine 104 may be configured to review the subscriber's social media activity and derive similar patterns.

In another implementation, the stylist and/or recommendation engine 104 may review a subscriber's friend list to recommend products. For instance, common workout trends may be identified among a subscriber's friends (such as via logged workouts and/or check-ins) and in response the engine 104 and/or curator may recommend products relating to the workout trend. In another instance, the recommendation engine 104 may determine from among the subscriber's friends, those which are also subscribers to the recommendation system, then use purchase/return trends of a subscriber's friends to predict the subscriber's behavior. For example, all of a subscriber's friends who received Product A from a curator returned the item; accordingly the system may determine not to send Product A to the subscriber (as he/she will likely also return it).

In yet another implementation, diversity in product selections may be based off of a first subscriber's friends. In other words, rather than providing similar items to friends, items are selected to ensure that friends receive different items. For example, if User A receives the recommended item of a specific jacket, it will be appreciated that friends of User A would feel that their recommendations are less personally tailored if they were to also receive the same jacket. Therefore, according to this embodiment, the system may decrease a recommendation score or rank of items which are provided to User A's friends. Additionally, or alternatively, items which are different than those which are provided to a user's friends are upweighted, so that friends each receive recommendations of different things In another embodiment, patterns are developed across multiple subscriber's social media feeds; in this instance these subscribers are not necessarily "friends" as that term is used in a social media context (though they may be in certain embodiments). In one specific implementation, a new exercise trend may be noticed across subscribers when various ones of the subscribers begin logging workouts, checking-in, and/or posting comments or pictures relating to the trend (e.g., Crossfit®, Orange Theory®, Barre®, etc.). In another implementation, patterns of behavior of a first subscriber may be predicted based on patterns expressed among other similarly situated subscribers. For example, it may be determined that subscribers who participate in long distance runs (e.g., five miles or more per workout) supplement their workouts with yoga; whereas subscribers who participate in short distance runs (e.g., three miles of fewer per workout) supplement their workouts with basketball; accordingly, yoga-related or basketball-related products may be provided to a subscriber based on their logged run workouts.

In a further implementation, the stylist may utilize the social media connection to the subscribers he/she styles to create challenges either to an individual subscriber or to the entire group or sub-group thereof. In one variant, the challenge may be related to a particular physical activity or sport of interest to the individual/group. In another alternative, the challenge may be related to nutrition, sleep, meeting goals, etc. The curator may also access and utilize information relating to challenges that the subscriber's which he/she styles have entered. This information is utilized to recommend items that might be helpful to the user in meeting the challenge (e.g., new shoes, running shorts, etc.). In addition, the stylist may offer a prize for the foregoing challenges including, e.g., an item that is based on the served demographic, an item which the subscriber has previously "liked" but not purchased, etc.

In another implementation, the curator may utilize social media to preview items for the subscribers he/she provides recommendations. For example, the curator may upload pictures, videos, text, etc. of the curator using or wearing a particular item. The subscribers which follow the curator's social media feed may then comment on, like, request, etc. the items. The subscriber's reactions may then be utilized to assist in providing further recommendations; the previewed items may additionally be provided (i.e., such as part of their subscription box) to the subscribers which "liked" the preview or otherwise provided positive feedback. This implementation may be further extended to include an ability of the subscribers themselves to upload pictures, videos, etc. of themselves wearing or using one or more of the recommended items he/she received. The subscriber's friends and/or a group of other subscribers styled by the same stylist may then comment, like, request, etc. the item(s). The stylist then uses these comments to provide further recommended products thereto. In addition, comments from the subscriber's friends who are not current subscribers or are styled by a different stylist may be forwarded to e.g., a subscription onboarding page or to the appropriate stylist.

Another social-based implementation includes querying the subscriber as to whether he/she would recommend the item to other subscribers. In one embodiment, if the subscriber indicates that he/she would recommend the item, an offer code, QR code, hyperlink, etc. may be provided for the subscriber to pass on to friends so that they may purchase the item and may include a discount to the subscriber if it is purchased and/or a discount to the friends which purchase the item. In another embodiment, friends may select products/items for other friends. In such embodiments, the first friend may select a particular item based on information that is known about the second friend as a result of their friendship, social media interactions, etc.; the first friend may purchase the item for the second friend or merely recommend it; moreover, it may be included in a box of other recommended items or provided separately therefrom. In addition, a note or gift message may be provided with the item. In a further embodiment, a first subscriber may rank his/her friends based on a similarity of style and/or interests. The subscriber's friends may also be subscribers to the recommendation service; or alternatively, may simply comprise social media connections.

In a further implementation, data may be extrapolated from the aforementioned friend recommendations to be applied to strangers. Suppose for example that a first subscriber and second subscriber have generally similar profiles and historically similar item purchases but are not otherwise socially connected; accordingly, a recommendation of an item by a friend to the first subscriber may trigger that same item to be recommended by the curator and/or recommendation engine to the second subscriber.

As noted elsewhere herein, certain rules may be applied to the curator's recommendations. For example, a total number of items may be required/limited, a total number of each type of item may be required/limited, temporal requirements may be implemented (e.g., no more than 1 pair of shoes per 2 months, no same item type sent within 2 months of last purchase of same item type, etc.). Additional rules may be placed on the total price per item and/or per entire shipment. Moreover, certain item combinations may be required (e.g., at least one bottom and at least one top, etc.). Still further, the rules engine may require that at least one key item or key trend (straps, color block, midriff, etc.) be provided in each box of recommended items. The key item, trend, and/or style items comprise items which pursuant to a business determination represent the brand, the season, etc. In a further implementation, a three-dimensional rules engine for shipment selections may be utilized wherein selection of a first particular item causes a number of additional items to be recommended as "going well with" the first selected item. In this manner, the recommended items are based on selection of a previous item; all recommendations are seeded based on the curator's first sections.

In yet another specific implementation, products or items may be tagged based on a particular subscriber's style and selection thereof. For example, if it is noted that a given number of subscribers who identify as having a "classic" style select a particular item or specific type of item, that item or those item(s) are retroactively tagged as being "classic" in style. Thereafter, other subscribers who also identify as having a preference for "classic" style will have the items recommended thereto as being within the "classic" style.

In another implementation, the foregoing systems and methods may be utilized to provide recommendations of only discounted items (such as outlet, warehouse, clearance, sale, etc. items) and/or the foregoing discounted items may be included in the aforementioned recommendation subscription. For example, the rules engine may dictate a minimum or maximum number of discounted items to be provided. In another embodiment, the discount may be applied to items which have been previously provided/recommended to a predetermined number of other subscribers, and which were returned without purchase (i.e., multiple return from previous recommendations).

Still further, the foregoing systems and methods may be utilized in a rental recommendation subscription. In one example, the recommended products may be provided to the subscriber for wear and use for a predetermined period of time and/or for as long as the subscriber would like to hold on to them. In one variant, the customer may return the all or some of the products at any time or on expiration of the rental period; and keep for purchase (including purchase at a discounted rate) those items which he/she would not like to return.

In another implementation, lifetime and/or lifestyle events are used as a basis for recommending products. For example, it may be determined from social media data and/or data directly from the relevant event administrators/coordinators (such as upon authorization of the participant), that a subscriber has signed up for an event such as e.g., the Tough Mudder®, the Boston Marathon®, etc. In another example, it may be determined from social media data, onboarding data, etc. that a subscriber likes or is a fan of a particular figure/athlete/celebrity/team; when that person/team becomes champion, wins, makes all-star team, etc. products may be recommended to the subscriber which are related to the accomplishment. In another variant, products related to events which are geographically near a subscriber are recommended irrespective of the particular subscriber's interest in the particular teams, players, etc. In a further variant, products may be recommended which are associated to city affiliated teams, players, and/or celebrities of old addresses and/or places the subscriber may have lived in the past.

Continuing the above example, other lifetime and/or lifestyle events which may be utilized to recommend products include e.g., birthdays, weddings, new baby, festivals and conventions, hospital visits; data indicative of the foregoing may be obtained from e.g., a subscriber's calendar, social media posts, private messages with the stylist, onboarding data, etc. In addition, for these events, stylists may provide items of particular interest to the subscriber, recovery related products, etc.; and in some instances certain items may be provided as gifts e.g., free of charge. In another variant, products may be recommended based on upcoming holidays for which people traditionally prepare (such as spring break, summer break, etc.), holidays in which it is traditionally harder to maintain fitness goals (e.g., winter holidays) and/or new fitness goals are created (e.g., new year).

In another implementation, data may be collected relating to one or more subscribers involvement in a team (e.g., a race team, walk team, cycling team, Team-in-Training®, Walk for the Cure®, Race for the Cure®, Special Olympics®, etc.) and a team specific shipment or delivery including items selected by e.g., the stylist, a team member, an event coordinator, etc. is provided. In another variant, the team subscriber's subscription may be limited to the training period only such that during the training period they receive recommended products and at the end of the training period, prior to an event, a special completion package of recommended products is provided. In a further embodiment, team subscribers may be provided special offers or discounts to transition to a general membership/subscription upon completion of the team subscription.

Additional implementations may include utilizing feedback and learning mechanisms to organize colors into groups or palettes. In one specific variant, this may be accomplished via placement of all of the colors used on clothing and (optionally) accessories into color umbrellas via utilization of metadata tags. Colors may be related using the aforementioned metadata tags. Hence it may be determined for example, that items with color A often also include color B. Hence, the system may recommend items with color A when an item having color B is selected by the curator. In another variant, color groupings may be learned based on stylist and/or consumer selections. For example, it may be derived that the curator and/or customer often selects items either having both colors A and B or individual items having color A and color B in the same purchase order. From this information, the recommendation engine may recommend items that have color A when items that have color B are selected by the curator and/or customer. In addition, the determined patterns may be used by the curator to ensure future recommendations for all subscribers include items which are "coordinated" in color, i.e., include colors which are often selected together.

In another implementation, a user's profile may be examined by e.g., the recommendation engine and/or the curator to identify patterns which do not tend to align, and then make product recommendations based thereon. For example, suppose a particular subscriber has never logged a swimming workout, then logs a completed triathlon. From this, the system may determine to recommend swimming related products to the subscriber. In a further implementation, a user's profile may reveal to the curator and/or recommendation engine milestones or achievements of the subscriber. For example, the subscriber has logged 1,000 miles biking, walking, running, swimming, or entered 1,000 hours of gym-based exercises, etc.

In yet another implementation, other products may be recommended and/or provided to subscribers via the herein described recommendation system (i.e., recommendation engine and human curator). For example, educational/instructional content may be provided in the form of: physical printed materials, digital content available at the user interface, and/or digital content which is accessed via a hyper link, QR code, etc. In another example, free passes or discount offers for particular fitness classes (whether digital or physical) may be sent or recommended. In yet another example, free trial periods or discount offers for subscription services may be provided (such as upgraded or premium membership to fitness tracking applications). In another example, a physical or digital lookbook may be provided based on the recommended items. The lookbook may include mix and match options and styling tips for the clothing and/or accessory products.

Finally, the recommendation system may further incorporate coaching features, such as via the curator, computer program, or other trained professional. In one embodiment, coaching is provided as a recommended item at discounted rates and/or one or more free sessions may be included among recommended items. Such coaching may include emotional support, digital coaching, and/or nutrition coaching.

Each of the foregoing implementations may be utilized in connection with any other one or ones of the other discussed implementations. The foregoing examples are described to be modular in nature, thereby enabling a vast landscape of possible implementations to be derived.

Exemplary Apparatus

An exemplary recommendation engine 104 and curator apparatus 106 are illustrated and discussed below with respect to FIGS. 6 and 7, respectively. It is appreciated, however, that the functionality of these two apparatus may be combined into a single apparatus such that one or more processors running on the combined apparatus are configured to perform the recommendation engine-related processing (as discussed below with respect to the recommendation engine 104) and the curator apparatus-related processing (as discussed below with respect to the curator apparatus 106). A user interface as discussed below for enabling the curator to interact with the curator-related processing is also provided in the combined apparatus.

Figure 6:
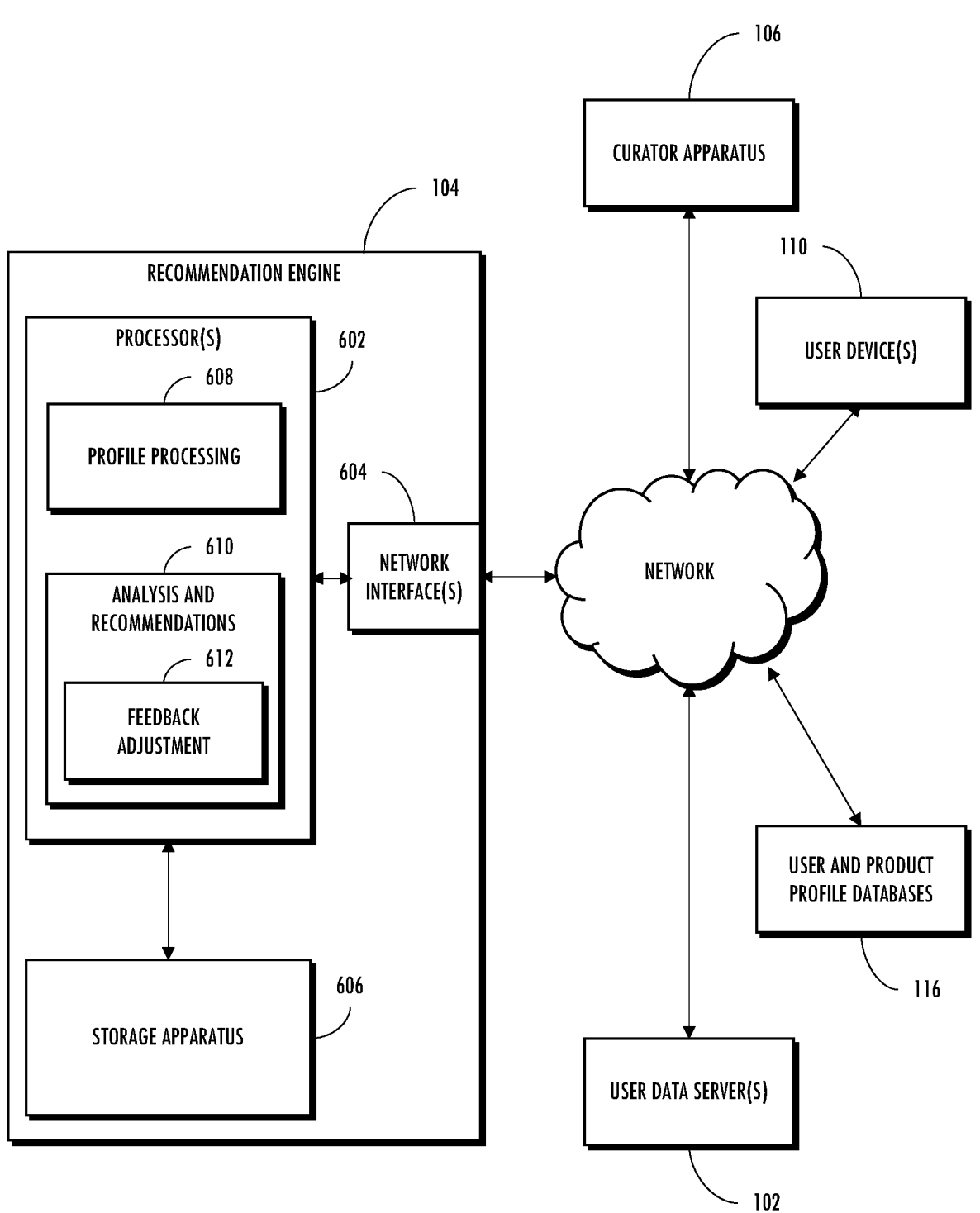
FIG. 6 is a block diagram illustrating an exemplary recommendation engine configuration for providing enhanced product recommendations in accordance with one embodiment of the present disclosure.

Referring now to FIG. 6, an exemplary recommendation engine 104 configuration for providing enhanced product recommendations in accordance with one embodiment of the present disclosure is given. The recommendation engine 104 may comprise a computerized apparatus which automatically recommends one or more products to individual users. As shown, the recommendation engine 104 generally includes a storage apparatus 606 and one or more processors 602 and network interfaces 604. Other components of the recommendation engine 104 may additionally be provided to ensure the functioning thereof (not shown).

The network interfaces 604 enable communication between the recommendation engine 104 and various network 108 entities including e.g., the curator apparatus 106, the user device 110, the user and product profile database 116, the customer database 158, the product database 156, and the user data server(s) 102. As noted above, in one embodiment, the network 108 to which the network interfaces 604 communicate comprises a wired and/or wireless, private and/or public network, including e.g., the Internet. Hence, the interfaces 604 themselves may comprise any appropriate networking communication interfaces for communication over the network 108.

The recommendation engine 104 further includes one or more processors or processor cores 602 configured to run various computer applications thereon, which may be stored at e.g., the storage apparatus 606. For the purpose of this application, including the claims, the terms "processor" and "processor cores" may be considered synonymous, unless the context clearly requires otherwise. Additionally, the storage apparatus 606 may include mass storage devices such as diskette, hard drive, compact disc read only memory (CD-ROM) and so forth. Additional features of the recommendation engine 104 may include e.g., input/output devices (such as display, keyboard, cursor control and so forth) and additional communication interfaces (such as network interface cards, modems and so forth), not shown. Moreover, the elements may be coupled to each other via system bus including one or more bridged busses (not shown).

The computer applications run by the processor 602 include one or more of: a profile processing application 608 and an analysis and recommendation application 610 which further comprises a feedback adjustment mechanism 612. Additional software applications and processes may be run at the processors 602 as well; the foregoing are merely exemplary. Moreover, the functionality described as attributable to one or more of the foregoing applications may be combined into fewer applications and/or a single application.

The profile processing application 608 comprises a software process which enables the recommendation engine 104 to generate a plurality of user and/or product profiles. As discussed above, a product profile is created for every available product. The profiles are built based on information about the product from other product data sources. Also discussed above, each user may be associated to two distinct user profiles, a static profile and a dynamic profile. As noted above, the user profiles may be created using information pulled from the user data server(s) 102. It is appreciated that in another embodiment, the recommendation engine 104 does not generate the herein described profiles, rather another entity (not shown) in communication with the recommendation engine 104 is charged with generating these.

Once created, the profiles are stored at a user and product profile database 116, and/or the customer database 158. The profile processing application 608 is further configured to update the user and product profiles such as, in response to newly collected activity and profile data. The profile processing application 608 may therefore cause periodic requests for newly sensed or monitored activity and profile data to be sent to e.g., the user data server(s) 102, and/or the user devices 110. The profile processing application 608 then accesses a previously created profile (created at the recommendation engine 104 or elsewhere), and utilizes a mechanism for weighting user activity events to increase/decrease a user's interest in one or more tracked aspects (such as e.g., running, leisure, yoga, basketball, etc.), such as the mechanism provided elsewhere herein.

The analysis and recommendation application 610 comprises a software process which enables the recommendation engine 104 to perform a comparison of a specific consumer's user profile(s) to each of the available product profiles. In one exemplary embodiment, this is performed via one or more of: (i) filtering in/out product profiles based on the consumer's static aspects; (ii) calculation of a scalar quantity via a dot product of a user dynamic profile vector and each of the filtered product profile vectors; (iii) comparison of the calculated scalar quantities to a threshold; and/or (iv) performing the calculations associated with the previously described score modules. Those ones of the product records which have a scalar quantity or an overall score at or above a given threshold are then listed as recommended products.

The analysis and recommendation application 610 further comprises a feedback adjustment mechanism 612 which comprises a software process which enables the recommendation engine 104 to utilize feedback to adjust one or more of: the calculation of recommended items, a threshold value for determining similarity of a product record to a user profile, the user profile(s), and/or the product records. The feedback mechanism 612 may be responsive to a first round of feedback based on data relating to a curator's selection from among a set of recommended items and a second round of feedback based on data relating to a user's selection from among a set of delivered items. Still further, the feedback mechanism 612 may weigh the curator's selections with more or less strength based on information obtained from the consumer himself and/or other factors. For example, the curator may decide that the user would not prefer patterned clothing; this feedback may be bolstered by the user's subsequent remarks that he/she would not prefer patterned clothing (if such is ultimately provided).

Figure 7:
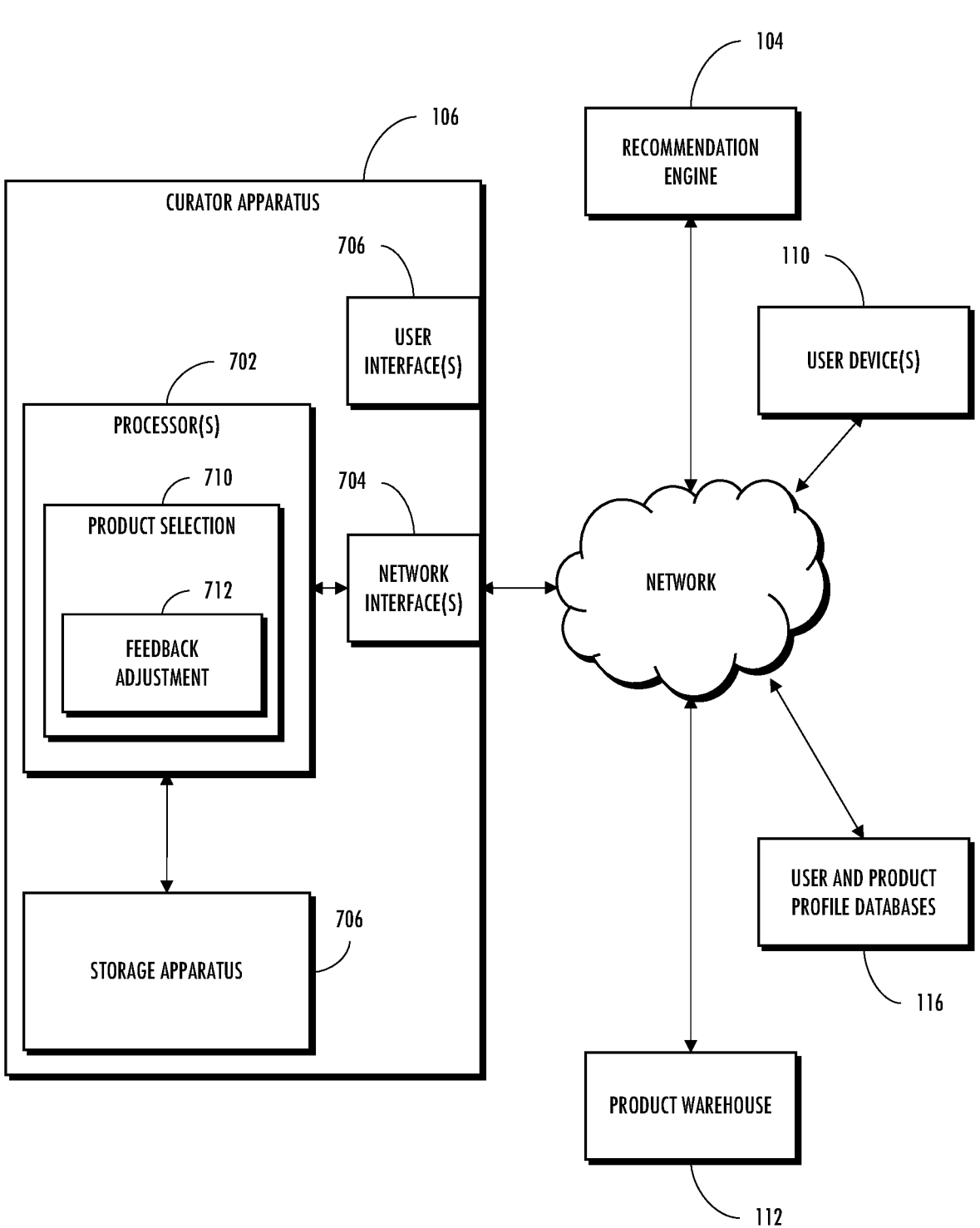
FIG. 7 is a block diagram illustrating an exemplary curator apparatus configuration for providing enhanced product recommendations in accordance with one embodiment of the present disclosure.

Referring now to FIG. 7, an exemplary curator apparatus 106 configuration for providing enhanced product recommendations in accordance with one embodiment of the present disclosure is illustrated. The curator apparatus 106 may comprise a computerized apparatus with which a curator entity interacts to effect delivery of recommended and selected products to a consumer. As illustrated, the curator apparatus 106 includes a storage apparatus 706, and one or more user interfaces 708, network interfaces 704, and processors 702 configured to run one or more software applications thereon (discussed below). The curator apparatus 106 further includes various other features which ensure functioning thereof (not shown). For example, the curator apparatus 106 may include e.g., input/output devices (such as display, touchpad, keyboard, cursor control and so forth) and additional communication interfaces (such as network interface cards, modems and so forth), not shown. Moreover, the elements may be coupled to each other via system bus including one or more bridged busses (not shown).

The storage apparatus 706 of the device is utilized to store information relating to a plurality of applications running on the curator apparatus 106. The storage apparatus 706 may include mass storage devices such as diskette, hard drive, compact disc read only memory (CD-ROM) and so forth.

The user interfaces 708 comprise means by which a user can interact with various ones of the applications or programs on the curator apparatus 106. In one embodiment, a graphic user interface (GUI) is displayed to the user via a display apparatus, which may be located within the curator apparatus 106 or separate therefrom.

The network interfaces 704 enable communication between the curator apparatus 106 and various network 108 entities including e.g., the recommendation engine 104, the user device 110, the user and product profile database 116, the customer database 158, the product database 156, and the user data server(s) 102. As noted above, in one embodiment, the network 108 to which the network interfaces 504 communicate comprises a wired and/or wireless, private and/or public network, including e.g., the Internet. Hence, the interfaces 504 themselves may comprise any appropriate networking communication interfaces for communication over the network 108.

The curator apparatus 106 further includes one or more processors or processor cores 702 configured to run various computer applications thereon, which may be stored at e.g., the storage apparatus 706. The storage apparatus 706 may include mass storage devices such as diskette, hard drive, compact disc read only memory (CD-ROM) and so forth. The computer applications run by the processor 702 include a product selection application 710 having a feedback adjustment mechanism 712. Additional software applications and processes may be run at the processors 702 as well; the foregoing are merely exemplary.

The product selection application 710 comprises a software process which enables the curator apparatus 106 to provide a means by which an operator/curator may select certain ones of the products recommended by the recommendation engine 104 for delivery to the consumer. Specifically, the product selection application 710 causes generation of the GUI which is displayed to an operator of the curator apparatus 106 (e.g., a curator). The curator selects from a selectable list of recommended products (recommended by the recommendation engine 104); the curator's selections are made based on knowledge and intuition of the curator him/herself. As noted elsewhere herein, selection of certain ones of the recommended products made by the curator via the GUI causes generation of a delivery order. The delivery order, once completed, is then provided to the product warehouse 112 and the appropriate products are caused to be shipped to the consumer. The GUI may further enable the curator to enter one or more reasons for his/her decision to select or not select particular items. The product selection application 710 is configured, in one embodiment, to provide information relating to the selected and not selected ones of the recommended products to the recommendation engine 104 as feedback to be used in sharpening the recommendations produced thereby.

The product selection application 710 further provides a means by which an operator/curator may communicate with the consumer. Specifically, when a human curator is matched to a particular consumer, in one embodiment, the curator may exchange messages with the consumer to determine his/her likes, interests, style, etc. In another embodiment, the product selection application 710 provides an interface whereby the curator can "follow" the consumer on various social media sites (such as those associated with the aforementioned heath-monitoring applications). In this manner, the curator may be altered when a user posts to his/her social media account and the curator may access the user's photos, postings, etc. and communicate to the user regarding purchased items, sports or activities of interest, etc.

The product selection application 710 further comprises a feedback adjustment mechanism 712 which comprises a software process which enables the curator to utilize feedback to adjust his/her future selections for that consumer. Specifically, the feedback mechanism 712, in one embodiment, displays a listing of which delivered items were purchased by the consumer, which were returned, and/or information provided by the user relating to a reason for the purchase or return of each item. The curator/operator may further utilize the feedback mechanism 712 to generate statistics and graphic representations of the user's purchase/return trends. The human operator/curator uses the information to inform his/her subsequent selections to that consumer.

In another embodiment, as noted above, the profile processing application 608, analysis and recommendation application 610 (including the feedback adjustment mechanism 612), and the product selection application 710 (including the feedback adjustment mechanism 712) are run as one or more applications at a combined recommendation and curator device (not shown).

In other embodiments, individual ones of the foregoing applications (608, 610, 612, 710, and 712) may be a launched via a generic browser, such as Internet Explorer, available from Microsoft Corp., of Redmond, Wash., or Safari from Apple Computer of Cupertino, Calif., e.g., such as in cases where the recommendation engine 104 and/or curator apparatus 106 comprises a desktop or tablet computer.

In another embodiment, a permanent copy of the programming instructions for individual ones of the aforementioned applications (608, 610, 612, 710, and 712) may be placed into permanent storage devices (such as e.g., the storage apparatus 606 and/or storage apparatus 706) during manufacture thereof, or in the field, through e.g., a distribution medium (not shown), such as a compact disc (CD), or through communication interface 604/704 (from a distribution server (not shown)). That is, one or more distribution media having an implementation of the agent program may be employed to distribute the agent and program various computing devices.

The herein described applications (e.g., applications 608, 610, 612, 710, and 712) improve the functioning of the recommendation engine 104 and/or curator apparatus 106, respectively or in combination by enabling it/them to provide enhanced product recommendations. Furthermore, devices that are able to provide recommendations using a two part system including both automatically generated recommendations and personalized human selected recommendations can operate more efficiently to provide highly personal and targeted products to a user and to improve accuracy of the automatic portion of the recommendation generation process via a two-part feedback mechanism.

In summary, a method of enabling product recommendations is disclosed. In one embodiment, the method comprises (i) receiving a plurality of product records and a plurality of user profiles, each of the plurality of product records and each of the plurality of user profiles comprising one or more aspects; (ii) applying a comparison algorithm to the one or more aspects of an individual one of the user profiles and the one or more aspects of each of the plurality of product records to identify a subset thereof which exhibit a threshold level of similarity; (iii) providing the identified subset of the plurality of product records to a selection entity, the selection entity configured to select first products from the identified subset for delivery to a consumer; (iv) utilizing information received from the selection entity which identifies second ones of the identified subset which were not selected to adjust one or more first factors of the comparison algorithm; and (v) utilizing information received from a product warehouse which identifies one or more of the first products which were delivered to the customer and subsequently returned to adjust one or more second factors of the comparison algorithm.

In another embodiment, the method comprises: (i) generating a plurality product records representative of a respective plurality of products for purchase, each of the product records comprising a number of descriptive aspects; (ii) obtaining consumer profile data relating to an individual consumer; (iii) converting the consumer profile data into a consumer profile record comprising a number of descriptive aspects; (iv) utilizing one or more of the descriptive aspects of the consumer profile to filter out a subset of the plurality of product records; (v) identifying, via a comparison of the consumer profile record against each of a subset of the plurality of product profile records which were not filtered out, one or more products which meet a threshold level of similarity to the consumer profile data; (vi) providing a list of the identified one or more products to a human operator; (vii) enabling the human operator to select from the list individual ones of the identified one or more products; (viii) generating a delivery order of the selected individual ones of the identified one or more products for delivery to the consumer; and (ix) adjusting at least one factor of the comparison based on the human operator selections.

In addition, an apparatus configured to provide product recommendations is disclosed. In one embodiment, the apparatus comprises: at least one network interface configured to receive a plurality of product records and a user profile; a storage apparatus; and a processor configured to execute at least one computer program, the computer program comprising a plurality of instructions which are configured to, when executed by the processor, cause the apparatus to: (i) apply a comparison algorithm to one or more aspects of the user profile and one or more aspects of each of the plurality of product records to identify a subset thereof which exhibit a threshold level of similarity to the user profile; (ii) provide the subset of the plurality of product records as a selectable list to a human operator via an interface, selection of individual ones of the selectable list by the human operator causing generation of feedback information regarding whether each of the subset was selected or not selected by the human operator and generation of a delivery order for delivery of products associated with the selected individual ones of the selectable list to a user associated to the user profile; and (iii) utilize the feedback information to adjust one or more factors of the comparison algorithm.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus configured to curate subscription boxes, the apparatus comprising:
   a network interface;
   a processor; and
   a non-transitory computer-readable medium comprising instructions which, when executed by the processor, causes the apparatus to:
   log-on to a curator account;
   obtain a task list assigned to the curator account, where the task list is associated with a set of subscribers that are involved in a team activity; and
   for a first subscriber of the set of subscribers that are involved in the team activity:
      obtain real-time biometric data measured by a user device during workouts of the first subscriber;
      compare the real-time biometric data to a workout goal threshold of the first subscriber;
      responsive to the workout goal threshold being met, filter a plurality of product records based on the real-time biometric data and a first set of social media posts of the first subscriber to create a filtered set of product records;
      obtain a recommended set of products associated with a friend of the first subscriber, where the first subscriber and the friend are involved in the team activity;
      select a subset of the filtered set of product records based on the recommended set of products associated with the friend; and
      order a subscription box for the first subscriber based on the subset of the filtered set of product records.

2. The apparatus of claim 1, where the recommended set of products comprise previously purchased products of the friend.

3. The apparatus of claim 1, where the recommended set of products comprise gift products for the first subscriber selected by the friend.

4. The apparatus of claim 1, where the subset of the filtered set of product records is selected based on a similarity to the recommended set of products associated with the friend.

5. The apparatus of claim 1, where the subset of the filtered set of product records is selected based on a diversity to the recommended set of products associated with the friend.

6. A user apparatus, the user apparatus comprising:
   a network interface;
   a user interface;
   a real-time biometric sensor;
   a processor; and
   a non-transitory computer-readable medium comprising instructions which, when executed by the processor, causes the user apparatus to:
   obtain subscriber onboarding input from a subscriber via the user interface;
   measure real-time biometric data during workouts of the subscriber via the real-time biometric sensor;
   compare the real-time biometric data to a workout goal threshold of the subscriber;
   enable social media activity associated with the workouts via the network interface;
   obtain product records for a plurality of different workout activities via the network interface;

responsive to a lifestyle event determined from the social media activity or the workout goal threshold being met, filter the product records based on the real-time biometric data, and the subscriber onboarding input, to create a filtered set of product records;
   obtain a recommended set of products associated with a friend of the subscriber;
   select a subset of the filtered set of product records based on the recommended set of products associated with the friend;
   order a subscription box from a product warehouse for the subscriber based on the subset of the filtered set of product records; and
   cause the product warehouse to ship the subscription box to the subscriber.

7. The user apparatus of claim 6, where the instructions, when executed by the processor, further causes the user apparatus to generate a user profile comprising:
   a static data structure based on the subscriber onboarding input; and
   a dynamic data structure based on the real-time biometric data.

8. The user apparatus of claim 7, where the dynamic data structure comprises user activity scores for the plurality of different workout activities calculated based on the real-time biometric data.

9. The user apparatus of claim 8, where the instructions, when executed by the processor, further causes the user apparatus to filter the product records based on a similarity between the user activity scores and one or more product activity scores.

10. The user apparatus of claim 6, where the instructions, when executed by the processor, further causes the user apparatus to display the subset of the filtered set of product records to the subscriber to confirm the subscription box.

11. The user apparatus of claim 6, where the friend of the subscriber comprises a human stylist.

12. A method for curating a subscription box for a subscriber, the method comprising:
   obtaining subscription information associated with the subscriber;
   obtaining real-time biometric data measured by a user device during workouts of the subscriber, where the real-time biometric data is compared to a workout goal threshold of the subscriber;
   obtaining social media posts associated with the workouts, where the subscriber and a friend identified in the social media posts are involved in a team activity;
   obtaining product records for a plurality of different workout activities; and
   generating the subscription box for the subscriber via a two part recommendation system comprising:
      responsive to the workout goal threshold being met, filtering the product records based on the social media posts and the subscription information to create a filtered set of product records;
      obtaining a recommended set of products associated with the friend;
      generating a curated set of products for the subscription box from the filtered set of product records and the recommended set of products associated with the friend;
      ordering the subscription box for the subscriber from a product warehouse; and
      causing the product warehouse to ship the subscription box to the subscriber.

13. The method of claim 12, where a recommendation engine generates the curated set of products for the subscription box.

14. The method of claim 12, where a human stylist generates the curated set of products for the subscription box.

15. The method of claim 14, where the social media posts are associated with a group of friends that includes the subscriber and the friend.

16. The method of claim 15, further comprising ordering a second curated set of products for a second subscriber of the group of friends.

17. The method of claim 15, where the social media posts comprise a subscriber post that indicates interest in the workouts.

18. The method of claim 15, where the social media posts comprise a workout challenge for the subscriber.

19. The method of claim 12, further comprising updating a curator feedback based on a difference between the curated set of products and the filtered set of product records.

20. The method of claim 12, further comprising updating a curator feedback based on product returns of the subscriber.

\* \* \* \* \*